US011501219B2

(12) United States Patent
Joyner

(10) Patent No.: US 11,501,219 B2
(45) Date of Patent: Nov. 15, 2022

(54) COMPUTER IMPLEMENTED METHODS AND SYSTEMS FOR CONNECTING PRE-AUTHORISED AND VERIFIED INDIVIDUALS FOR ACCOMPANIED TRANSPORTATION

(71) Applicant: John Joyner, Melbourne (AU)

(72) Inventor: John Joyner, Melbourne (AU)

( * ) Notice: Subject to any disclaimer, the term of this patent is extended or adjusted under 35 U.S.C. 154(b) by 0 days.

(21) Appl. No.: 17/132,505

(22) Filed: Dec. 23, 2020

(65) Prior Publication Data

US 2021/0133640 A1 May 6, 2021

Related U.S. Application Data

(63) Continuation of application No. PCT/AU2019/051378, filed on Dec. 13, 2019.

(30) Foreign Application Priority Data

Dec. 13, 2018 (AU) .............................. 2018102062
Jul. 8, 2019 (AU) .............................. 2019902423

(51) Int. Cl.
*G06Q 10/02* (2012.01)
*G06F 21/32* (2013.01)
(Continued)

(52) U.S. Cl.
CPC ............ *G06Q 10/02* (2013.01); *G06F 21/32* (2013.01); *G06Q 10/109* (2013.01); *G06Q 10/1095* (2013.01); *G06Q 50/30* (2013.01)

(58) Field of Classification Search
CPC ...... G06Q 10/02; G06Q 50/14; G06Q 20/401; G06Q 30/06; G06Q 50/30; G06Q 10/025; G06Q 10/08; G06Q 30/0609; H04W 4/02
See application file for complete search history.

(56) References Cited

U.S. PATENT DOCUMENTS 7,312,712 B1 * 12/2007 Worrall ................. G08B 21/02
379/38
7,941,267 B2 5/2011 Adamczyk et al.
(Continued)

FOREIGN PATENT DOCUMENTS

CN 108111403 A * 6/2018

OTHER PUBLICATIONS

K. Rehrl, et al. "Assisting Multimodal Travelers: Design and Prototypical Implementation of a Personal Travel Companion," in IEEE Transactions on Intelligent Transportation Systems, vol. 8, No. 1, pp. 31-42, Mar. 2007, doi: 10.1109/TITS.2006.890077. ieeexplore.ieee.org/document/4114349?source=IQplus (Year: 2007).*
(Continued)

*Primary Examiner* — Jerry O'Connor
*Assistant Examiner* — Michael R Koester
(74) *Attorney, Agent, or Firm* — Myers Wolin, LLC

(57) ABSTRACT

A system and method are provided for connecting individuals for accompanied transportation. A method includes receiving input from a traveller, including transportation parameters, receiving input from a pre-authorised companion, including transportation parameters, and executes a transportation optimisation step including comparing transportation parameters and an assessment of one or more safety related parameters. The method then presents one or more optimised transportation proposal for acceptance by the traveller. Upon registering traveller selections and acceptance of the transportation proposal, the method notifies the traveller and selected companion and provides to the traveller or companion verification means prior to or at the accepted meeting time to enable verification of identities of the traveller or companion upon meeting. The method further monitors the safety related parameters to determine whether those parameters are satisfied and effects commu-
(Continued)

nication with the traveller or companion in response to the monitored one or more safety related parameters.

30 Claims, 8 Drawing Sheets

(51) Int. Cl.
*G06Q 10/10* (2012.01)
*G06Q 50/30* (2012.01)

(56) References Cited

U.S. PATENT DOCUMENTS

| | | | |
|---|---|---|---|
| 2016/0203576 A1 | 7/2016 | Novak | |
| 2018/0182055 A1* | 6/2018 | Jepson | G16H 10/60 |
| 2018/0352378 A1* | 12/2018 | Sahadi | G06Q 10/047 |
| 2019/0206009 A1* | 7/2019 | Gibson | G06Q 10/06315 |
| 2020/0155407 A1* | 5/2020 | Chernicoff | G01C 21/3438 |

OTHER PUBLICATIONS

International Search Report corresponding to International Patent Application No. PCT/AU2019/051378 dated Mar. 6, 2020.
Dieker, "Job of the Day: People Walker," retrieved from the internet on Aug. 16, 2019 from URL <http://www.thebillfold.com/2016/10/job-of-the-day-people-walker/>, pp. 1-6, The Billfold, Oct. 3, 2016.
Written Opinion of the International Preliminary Examining Authority issued for corresponding to International Patent Application No. PCT/AU2019/051378 dated Sep. 28, 2020.

* cited by examiner

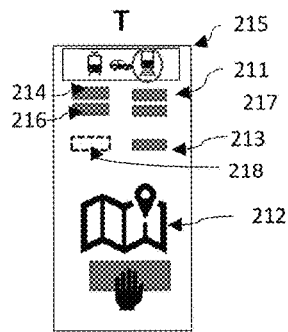
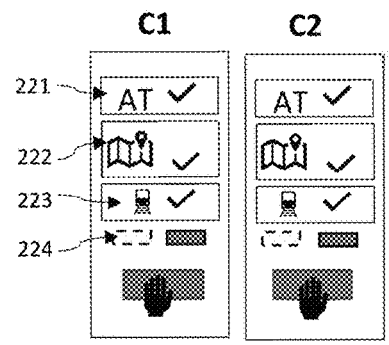
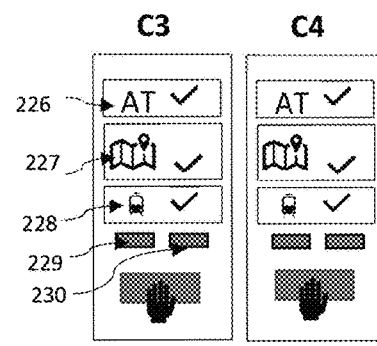
FIG 6A  FIG 6B  FIG 6C
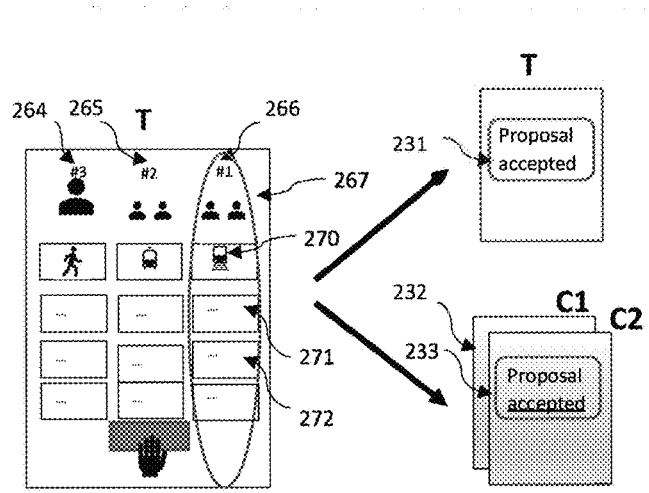
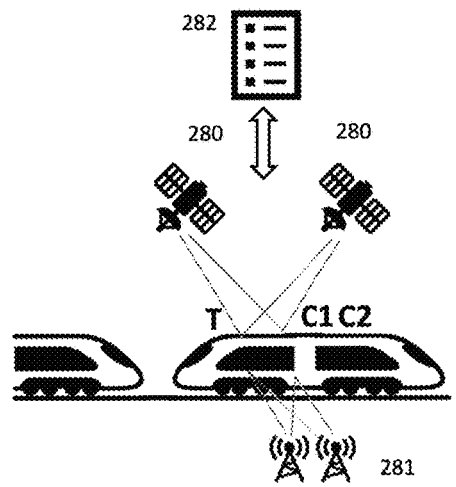
FIG 6D  FIG 6E  FIG 6F
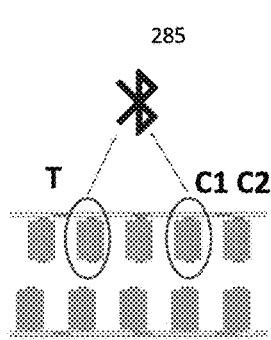
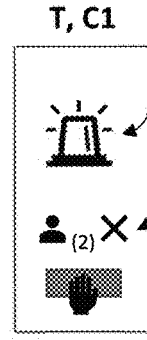
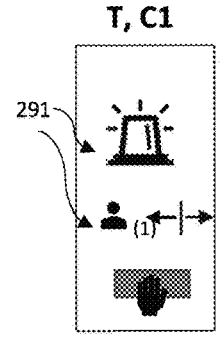
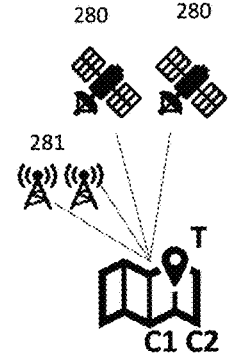
FIG 6G  FIG 6H  FIG 6I  FIG 6J

COMPUTER IMPLEMENTED METHODS AND SYSTEMS FOR CONNECTING PRE-AUTHORISED AND VERIFIED INDIVIDUALS FOR ACCOMPANIED TRANSPORTATION

CROSS REFERENCE TO RELATED APPLICATIONS

This application is a continuation of International Application PCT/AU2019/051378, filed Dec. 13, 2019, which claims priority to Australian patent applications 2018102062, filed Dec. 13, 2018, and 2019902423, filed Jul. 8, 2019, the contents of each of which are incorporated by reference herein.

TECHNICAL FIELD

This invention relates to methods and systems for connecting pre-authorised and verified individuals for secure personal transportation, and in particular for secure ambulatory transportation.

BACKGROUND

Ambulatory transportation, particularly where an individual is travelling alone, may be subject to a variety of risks and threats. In particular, factors such as the security of the location for travel, the ability for the individual to defend themselves against others, the knowledge that the individual has about the environment and the state of mind or body of the individual, amongst others, are important in the overall risk profile of ambulatory transportation.

Unfortunately, examples of attacks on individuals walking alone in isolated environments are all too common.

On the other hand, there may be many individuals willing to offer security in the form of accompanying other individuals during ambulatory transportation.

There is perceived a need to enable the connecting of individuals to improve the security of transportation of one or more individual.

In the past, there have been attempts to increase traveller's awareness of safety issues that may affect ambulatory transportation, including by platforms that notify travellers of what is happening around them through crime data sourced from local and government agencies and form other travellers or other users. Also, virtual companions have been offered such that a traveller is connected via the traveller's personal telephone to a live security professional or 'checked on' by a service operating through the personal electronic device. However, none of these measures operate to connect an individual willing to offer assistance (companion) to another person seeking to safely reach a destination (traveller).

There are challenges inherent in connecting a person to other people willing to offer assistance to improve the security of the person's transportation, for example ensuring that those offering assistance are trustworthy, reliable, and accountable for the assistance provided.

There are also other challenges in improving the security of transportation due to environmental factors such as the safety of particular neighbourhoods, the time of the day, and how populated an area may be at that time, for example.

A major challenge is harnessing the willingness of some individuals to assist others in need of accompanied transportation. In particular, potential companions may desire to assist others (e.g. motivated by 'public spiritedness' or other community oriented values) but have no practical means available to offer that assistance.

Another impediment to encouraging participation in any accompanied transportation is certainty regarding the information provided to the participant who may be in a relatively vulnerable position (e.g. finding their way home, alone, at night). In order for an individual traveller to connect with a complete stranger, particularly in the context where the traveller and stranger are travelling together, and probably alone or at least in an environment with a lower security level (e.g. a quiet street or city park late at night), parties must at a minimum be very well informed about the arrangement. There must be a sufficient amount of, and a high degree of clarity in, information available to the parties (in particular the traveller) to achieve a level of trust for an such arrangement to be entertained. Further, the more vulnerable party (traveller) may require the ability to exercise control over the arrangement, need to be confident in the safety parameters of the arrangement, and be confident that they will be informed about any important adverse change to said parameters, in order to seriously consider the proposition. Prior methods have not addressed this comprehensive approach to managing the problem of sharing information between potential parties to an accompanied transportation arrangement.

Additionally, maximising the convenience to potential parties to accompanied transportation cannot be overstated. While some members of the community would be willing to go significantly out of their way (e.g. in a time-based sense and/or in a geographical or distance-sense), many others will only be willing to participate if they have certainty that they will not be substantially inconvenienced (and a degree of control over that commitment). Any solution must minimise, as far as practicable, the effort that a potential participant (particularly those offering assistance) must go to when providing assistance.

Further, different individuals may have significantly different levels of risk tolerance in accompanied transportation, so any means of facilitating same must provide a variety of parameters to be attractive to different users. It is anticipated that accompanied transportation will only work effectively where a 'critical mass' of numbers of persons are willing to participate, as the nature of the tool is to connect people together in situations where either there are few others around (e.g. late at night), or the environment is foreign (in which case there may be fewer potentially acceptable options due to a lack of shared parameters between the participants, such as a common language).

Furthermore, it may be considered inappropriate to approach a stranger and propose accompanied transportation, and even more inappropriate (and risky) to let them know your travel plans, particularly after dark. This is a significant problem to be overcome.

In summary, it can be understood that providing means for accompanied transportation may face one or more of the following difficulties or problems:

Managing the security or safety-related concerns of individuals, whether known or unknown Monitoring parties to accompanied transportation to improve safety Keeping parties notified of any safety-related aspects Ensuring a high level of trust in any accompanied transportation Maximising the convenience of individuals providing accompanied transportation assistance Maximising the sharing of transportation paths Providing safer alternatives to vehicular transportation Harnessing the willingness of community members to offer assistance Utilising pre-existing travel plans of one or more community members to facilitate safer group transportation Utilising community members engagement with public transportation to increase potential for accompanied transportation Managing privacy or consent-related concerns of individuals engaging in accompanied transportation Ensuring that individuals are trustworthy, reliable, and accountable in relation to providing accompanied transportation assistance Embodiments of the present invention seeks to provide methods and systems for accompanied transportation which will overcome or substantially ameliorate at least one or more of the deficiencies of the prior art, or to at least provide an alternative.

While ambulatory transportation is targeted, it will be appreciated that the present invention may apply to other modes of transportation such as private vehicular transportation, or public transportation (e.g. on trains, trams or buses).

It is to be understood that, if any prior art information is referred to herein, such reference does not constitute an admission that the information forms part of the common general knowledge in the art, in Australia or any other country.

SUMMARY

According to a first aspect of the invention, there is provided a computer implemented method for connecting pre-authorised and verified individuals for accompanied transportation, including the following steps: receiving input from a pre-authorised traveller, including traveller specific transportation parameters; receiving input from one or more pre-authorised companions, including companion specific transportation parameters; executing a transportation optimisation step including comparing and matching the transportation parameters of the pre-authorised traveller with the transportation parameters of the one or more of the pre-authorised companion(s), wherein the optimisation step includes an assessment of one or more safety related parameters; presenting one or more optimised transportation proposal(s) for acceptance by the traveller, wherein the presentation of the transportation proposal(s) includes presenting one or more matched parameters for selection, wherein the matched parameters include the one or more safety related parameters; then, upon registering traveller selections and acceptance of the transportation proposal, notifying the traveller and the selected optimised companion(s) that the transportation proposal has been accepted; providing to a traveller or companion(s) verification means prior to or at the accepted meeting time to enable verification of the identities of the traveller and/or one or more selected optimised companion(s) when the traveller and the companion (s) meet; and monitoring the one or more of the safety related parameters in real-time to determine whether those parameters are satisfied, wherein the accompanied transportation is, at least in part, ambulatory accompanied transportation.

Preferably, the method includes a further step of effecting real-time communication with the traveller and/or companion in response to the monitored one or more safety related parameters.

Preferably, the communication is made by means of an alert, prompt, suggestion or other communication made directly to the traveller and/or companion. Preferably, the communication is made via a personal electronic device of the traveller and/or companion.

Preferably the real-time communication is made in one or more of the following instances:

To increase the rating of safety related parameters selected by the traveller and/or companion (e.g. a suggestion to change the transportation path to increase the security of said path);

As a preliminary step during initial assessment of potential companions (e.g. to increase the pool of potential companions, and thereby a more secure transportation proposal than would otherwise be available)

To provide an alert or explanation to the traveller and/or companion as to a safety related parameter (e.g. why a transportation path is more secure; or why a safety related parameter changes, such as where a companion is added or leaves an accompanied transportation)

Preferably, the assessment of one or more safety related parameters during the optimisation step includes an assessment of any deficiencies in the one or more safety related parameters input by the traveller or companion, and adding one or more safety related parameters for comparison and matching in the optimisation step.

Preferably, during the presentation of proposals for acceptance step, the traveller or companion is able to select one or more safety related parameters received as input by the traveller or companion and/or one or more safety related parameters generated as a result of the assessment of safety related parameters during the optimisation step.

One or more safety related parameter is preferably able to be updated by the companion and/or traveller in real-time during the course of an accompanied transportation.

Preferably, the one or more safety related parameters include parameters that specify the minimum and/or maximum distances between companion(s) and the traveller during the accompanied transportation.

Safety related parameters may include parameters relating to the security rating of a transportation path, meeting place and/or mode of transportation.

The one or more safety related parameters may include one or more of the following:

location of the party (i.e. traveller or companion) relative to a meeting place;

the number of parties in an accompanied transportation;

the rating or other characteristics of the party (e.g. where the companion has some addition security qualification or experience);

expected waiting time until the accompanied transportation begins;

the duration of the accompanied transportation; and/or location of the party relative to an accepted transportation path during the accompanied transportation.

Preferably, the security rating of any of the transportation parameters regarding a meeting place or potential transportation path includes any one or more, or any combination of the following:

lighting rating;

criminal activity (both current and historical) rating in the area;

the amount of traffic;

the number of open commercial establishments;

the number and/or relative location of user identified secure spots; and/or traveller or companion feedback in relation to the above.

The method of the invention may include means to recognise that a traveller or companion is travelling on or using a particular mode of transportation. The particular mode of transportation that is able to be recognised includes ambulatory transportation, or walking. It may also include riding a non-powered vehicle such as a non-powered bicycle or a scooter.

Preferably, the method includes means to recognise that a traveller or companion is travelling on or using a particular mode of communal vehicular transportation. The mode of communal vehicular transportation may include travel by one or more of the following:
- train
- tram
- bus, or other mass-transit vehicle
- ferry, or other mass-transit water craft Preferably, the mode of communal vehicular transportation may include modes of transportation accessible to members of the public.

Preferably the method includes means to recognise that a traveller or companion is travelling on or using a particular communal vehicle. For example, a particular communal vehicle may be the (singular) train that departs a specific station at a specific time. More generally, the communal vehicle comprises one or more of the following: a particular train; a particular tram; a particular bus, or other mass-transit vehicle; or a particular ferry, or other mass-transit water craft.

Preferably, recognising a mode of communal vehicular transportation and/or a particular communal vehicle includes assessing one or more of the following characteristics of a communal vehicle, including:
- the scheduled location of the vehicle
- the actual location of the vehicle (via, for example, a GPS or other locating device present on the vehicle itself; and such information being shared into the system administering the method)
- the collective movement of a plurality of companions and/or travellers
- the relative location of two or more travellers and/or companions
- communication from a companion or traveller contemporaneously on the vehicle A safety related parameter may include a traveller request that the companion(s) separate from the traveller. In a preferred form, the separation request includes separation request parameters such as a predetermined distance between the traveller and the companion(s) and/or that separation occur within a predetermined time after the request has been made. The method preferably includes the step of checking that, in response to a separation request, the separation parameters are satisfied.

Preferably, real-time monitoring of safety related parameters and/or real-time recognition of the mode of transportation is enabled by application of one or more of the following features on a personal electronic device used by the relevant party to the accompanied transportation:
- GPS
- A-GPS
- Bluetooth
- LTE Beacon
- Other short or medium range wireless communication technology
- Optical distance measuring device
- Laser sensor (e.g. an eye safe class 2 visible laser)

Preferably, any optical or laser based distance measuring device, for monitoring the relative distance between a companion and a traveller, is wearable on the clothing of the companion, facing the front, to provide the appropriate focus for measuring the distance between the companion and the traveller.

In a preferred form, NFC technology on the respective device of a traveller and companion, is able to be used to recognise where a companion is very close to a traveller (e.g. breaching the minimum distance parameter set by the traveller or the system).

Preferably, the system administering the method is able to independently set, or provided recommended, safety related parameters.

Preferably, real-time recognition of the mode of communal vehicular transportation is enabled by the personal electronic device of the traveller or companion communicating with an electronic device on the communal vehicle in which the traveller or companion is located.

The method preferably includes sending an alert or otherwise communicating with a potential companion, as a preliminary step during the optimisation step. Preferably, the preliminary step includes undertaking a search for potential companions that have not 'activated' their companion status, but who otherwise would have high (relative to the already 'active' companions) parameter matching based on the traveller specific parameters and safety related parameters, in particular. Preferably, the preliminary step includes requesting whether an identified potential companion is willing to participate in an accompanied transportation.

The method may include, in relation to a proposed accompanied transportation, making one or more optimised transportation suggestions to the traveller and/or companion regarding the safety related parameters or mode of transportation, based on the assessment of the safety related parameters, prior to acceptance of the proposal. Preferably, an optimised transportation suggestion is made based on an optimised comparison of the proposed transportation path of the traveller and a pre-existing transportation path(s) of one or more potential companion(s).

The pre-existing transportation path of the companion may be sourced from a third party map or travel planning resource. Preferably, the third-party map or travel planning resource comprises an application on the personal electronic device of the companion. It is further preferred that the third-party map or travel planning resource provides data sharing with the system administering the accompanied transportation, such that companion travel planning is available as companion specific transportation parameters.

The method may include, in relation to the transportation parameters of an existing accepted accompanied transportation, sending alerts to or otherwise communicating to the traveller and/or companion, regarding the safety related parameters or mode of transportation during the course of an accompanied transportation.

Preferably, the method includes the step of registering the personal devices used by each traveller and companion, and monitoring whether the registered personal device kept on the person of the traveller and companion(s) during any agreed transportation. Preferably, monitoring of whether the registered personal device kept on the person of the traveller and companion(s) is attained by requesting the user to regularly respond to requests for maintained verification.

Requests for maintained verification may include requiring the party to provide identification confirmation information such as:
- Entering an ID number or code words assigned to the party;
- audio/visual data matching based on comparison of a real-time voice and/or image recording of the party taken by the personal device, with a previously supplied voice and/or image recording of the traveller or companion(s);

digital fingerprint matching based on comparison of a real-time digital fingerprint reading of a party;

confirmation of the relative location of the other traveller and/or companion(s); and/or an identification process provided by a third party application.

Preferably, requests for maintained verification include requests at one or more stages between the commencement and the end of the accompanied transportation. Requests for maintained verification include a request at the end of the accompanied transportation.

Preferably, the traveller destination is not precisely communicated to the one or more companion(s). Preferably, the destination is presented to the companion using a randomly centred circle on a graphical map-based representation of the destination.

In relation to any completed accompanied transportation, a traveller may be rated by a companion and/or a companion may be rated by a traveller and/or a companion may be rated by another companion. In a preferred form, in relation to any completed accompanied transportation, a traveller or a companion may be rated by the system administering the accompanied transportation.

The rating of the traveller or companion is preferably decreased if an accepted parameter of an accompanied transportation is breached.

Companion rating may be decreased if a companion has breached the safety related parameters comprising one or both of the minimum and/or maximum distances between companion(s) and traveller, or adherence of the companion to an accepted transportation path, or a satisfaction of a separation request, during completed accompanied transportations.

Preferably, the rating of the companion is increased for every successfully completed accompanied transportation, wherein a successfully completed accompanied transportation may be determined by the system administering the method, the traveller, or a combination of the two.

Verification means preferably includes audio/visual data matching based on comparison of a real-time voice and/or image recording of the traveller and/or companion(s) taken by personal device of another traveller and/or companion(s), with a previously supplied voice and/or image recording of the traveller or companion(s).

Verification means preferably includes confirmation of the relative real-time location of the other traveller and/or companion(s).

Preferably, the system administering the method records the verification of the identities of the parties.

Ambulatory accompanied transportation includes the companion accompanying an ambulatory traveller for at least a part of the accompanied transportation.

The accompanied transportation preferably includes one or more travellers being accompanied by a plurality of companions. The plurality of companions may include a least one principal companion. Preferably, the principal companion selects transportation parameters indicating they will accompany a traveller for the complete duration of the accompanied transportation. The principal companion preferably has a rating in the highest rating band for companions. The principal companion preferably has verified public security and/or public safety related qualifications and/or experience.

Pre-authorisation preferably includes requiring an individual to agree to the terms and conditions for engaging in accompanied transportation.

The method preferably includes as a preliminary step in order to receive input from a traveller or companion, confirmation by the traveller or companion, respectively, of agreement to the terms and conditions for engaging in accompanied transportation.

According to a second aspect of the invention, there is provided a computer implemented method for connecting pre-authorised and verified individuals for accompanied transportation, including the following steps: Receiving input from a pre-authorised traveller, including traveller specific transportation parameters; Receiving input from one or more pre-authorised companions, including companion specific transportation parameters; Executing a transportation optimisation step including comparing and matching the transportation parameters of the pre-authorised traveller with the transportation parameters of the one or more of the pre-authorised companion(s);

Presenting one or more optimised transportation proposal (s) for acceptance by the traveller, wherein the presentation of the transportation proposal(s) includes presenting one or more matched parameters for the traveller for selection; Upon registering traveller selections and acceptance of the transportation proposal, notifying the traveller and the selected optimised companion(s) that the transportation proposal has been accepted; Providing to a traveller or companion(s) at least one of the following verification means prior to or at the accepted meeting time to enable verification of the identities of the traveller and/or one or more selected optimised companion(s) when the traveller and the companion(s) meet:

a visual or audio recording of the companion(s) or traveller descriptions of the physical features of the companion(s) or traveller ID numbers or code words assigned to the companion(s) or traveller audio/visual data matching based on comparison of a real-time voice and/or image recording of the traveller and/or companion(s) taken by personal device of another traveller and/or companion(s), with a previously supplied voice and/or image recording of the traveller or companion(s)

digital fingerprint matching based on comparison of a real-time digital fingerprint reading of one of the travellers and/or companion(s) taken by the user device of another traveller and/or companion(s)

confirmation of the relative location of the other traveller and/or companion(s)

an identification process provided by a third party application

Preferably, verification is able to be performed contemporaneously (or in real-time) when the traveller and companion(s) meet.

Preferably, the accompanied transportation is ambulatory. Alternatively, the accompanied transportation may be provided by other means such as by private vehicle or public transport.

Pre-authorisation of travellers and/or companions may include one or more, or any combination of the following: obtaining digital fingerprint or other biometric data; obtaining a photographic image; obtaining a voice and/or image file or recording; obtaining authorisation to access a personal electronic device of a traveller or companion; obtaining authorisation to access location information regarding a personal electronic device of a traveller or companion; obtaining authorisation to access accounts held by a traveller or companion in relation to one or more social media, social search or related applications; obtaining other details connected to the traveller or companion, such as a driver's licence and/or other secure identification details such as passport or social security number; obtaining a police and/or other security check; obtaining consent to be rated by other users; and/or obtaining traveller or companion identification information including, one or more of the following: a description of physical features or contact details such as a home or work address, a telephone number or an email address, and/or date of birth.

The photographic image provided for pre-authorisation or verification means may be required to meet criteria including image quality, clarity of facial features, or other criteria applied in passport photography. Other qualitative requirements may be required in relation to material usable for pre-authorisation, including sound quality for voice recording or image quality for a video recording.

Authorisation to access a personal electronic device of a traveller or companion may include authorisation to access the device (and/or one or more applications thereon) prior to, during and immediately after the traveller or companion engages in accompanied transportation. Authorisation to access a personal electronic device may include authorisation to access the camera and/or microphone of the device.

Obtained identification information is preferably cross-checked with information sourced from third party databases.

Traveller specific transportation parameters may include one or more, or any combination of the following: current or intended future location; current or intended future path of travel; proposed accompanied transportation path; preferred mode of transportation; proposed meeting place; proposed destination; the expected duration of time to complete the accompanied transportation; acceptable wait time to meet a companion; preference to hide the proposed destination from the companion; proposed meeting time; companion preferences, including personal characteristics such as age, sex and/or religion; minimum and/or maximum distance between companion(s) and traveller; group travel preferences; traveller rating.

Companion specific transportation parameters may include one or more, or any combination of the following: current or intended future location; current or intended future path of travel; the expected duration of time to complete the accompanied transportation; current or intended future mode of transportation; acceptable wait time to meet the traveller; whether part of a group; mode of transportation; the number in the group; acceptable meeting place; acceptable destination; acceptable meeting time; traveller preferences, including personal characteristics such as age, sex and/or religion; acceptable minimum and/or maximum distance between companion(s) and traveller; or companion rating.

Group transportation preferences may include whether a traveller requires group travel and the number of companions providing accompanied transportation for at least part of the accompanied transportation. The at least part of the accompanied transportation for group transportation may be, for example, group travel while the accompanied transportation is provided on a public transport mode of travelling or for an initial segment of the accompanied transportation only.

One or more transportation path(s) may include one or more potential transportation path(s) being a path from a traveller proposed meeting place to a traveller proposed destination, or to some nearby location.

A time (e.g. a meeting time) is to be understood as including a window of time.

The term 'contemporaneous' should be understood, in some forms of the invention, as including a time shortly before or after the associated event (e.g. the traveller verifying the identity of the companion shortly before the companion verifies the identity of the traveller).

Preferably, the traveller is presented transportation proposal and can select at least one or a group of companions (e.g. a pre-identified group of female companions), but until the time of acceptance of the proposal by the traveller, the companion(s) are not presented any information in relation to the traveller.

The traveller and/or companion may apply an increased weighting to certain parameters.

The transportation optimisation step preferably includes ranking the companion(s) in the order of those whose parameters most closely match the parameters of the traveller. The ranking of companion(s) includes regression analysis of the corresponding parameters of the traveller and the companion(s). Parameter matching approaches that may be used in the optimisation step in the method, include non-linear regression, tree-based methods (e.g. bagging, boosting and random forest) or support vector machines (e.g. finding a hyperplane in an n-dimensional model where n is the number of traveller and companion parameters to be matched). Other techniques referred to below in the context of the optimisation step may be applied.

Matched proposal parameters may include one or more, or any combination of matching traveller and companion(s) parameters set out above.

The matched proposal parameters may include one or more matched meeting time(s), one or more matched meeting place(s), one or more matched transportation path(s) or destination(s), and one or more matched companion(s) for the traveller for selection.

Preferably, a transportation proposal may include a presentation of one or more parameters for selection or a complete transportation proposal for acceptance.

Preferably, after a suggestion is made to a traveller and/or companion, and the traveller or companion modifies their transportation parameters, the optimisation step is further executed before the transportation proposal is presented.

Preferably, the optimisation step includes recognising where modifications to traveller or companion parameters will improve traveller and companion matching, and making traveller or companion suggestions for modification of parameters in accordance with the recognised the improved matching. Preferably, the optimisation step includes applying artificial intelligence in the recognition of improved matching and/or making parameter suggestions or modifications. Preferably, machine learning techniques are applied including one or more of, or a combination of the following: a supervised learning technique; an unsupervised learning technique; a semi-supervised learning technique; an active learning technique; a transfer learning technique; and/or other techniques known to the person skilled in the art. In particular, one or more or a combination of the following techniques may be applied: decision tree learning, association rule learning, artificial neural networks including CNNs, inductive logic programming, clustering, Bayesian network, reinforcement learning, K-NN, pattern recognition, RNN (LSTM), a GAN model, Word2Vec, Named Entity Recognition, Latent Dirichlet Allocation, a combinatorial model, a bag of words model; artificial neural network models for natural language processing (NLP); computer vision, including image recognition (e.g. using computer vision to determine the location of a person based on a photo of their surroundings provided by that person).

The transportation optimisation step may include an assessment of other input when providing transportation proposal parameters for selection by the traveller. The other input may include a distance efficiency rating of the one or more potential transportation path(s). Preferably, the other input may include a security rating for the transportation path(s) or meeting place(s). The security rating of any of the transportation parameters regarding a meeting place or potential transportation path includes any one or more of the following: lighting rating; criminal activity (both in real-time and historical) rating; the amount of traffic; the number of open commercial establishments; the number and/or relative location of user identified secure spots; or traveller or companion feedback in relation to the above.

It will be understood that the method and system of the invention may operate with minimal 'active' input from the traveller or companions. Input may be received 'passively' by receiving input from the personal electronic device of the traveller or companion (e.g. location, direction or speed of movement, determined mode of transportation). Other input may comprise 'passively' received input.

Preferably, the method according to any one of the preceding claims, wherein the method includes means to recognise that a traveller or companion is travelling on a particular mode of transportation. The method may be able to access real-time traveller or companion location information to determine the particular mode of transportation.

The presentation of the transportation proposal preferably includes presenting one or more of the transportation parameters for the traveller for selection.

The method preferably includes sending alerts to, making transportation suggestions to, or otherwise communicating to the traveller and/or companion in relation to the transportation parameters. A communication may be made to the traveller or companion comprising one or more of the following: suggesting one or more meeting place(s) or potential transportation path(s); suggesting one or a group of companions; and/or suggesting a modification to a traveller or companion selected parameter.

The communication may be made to a traveller or a group of travellers to propose that the traveller(s) become companion(s).

The communication may be made on the basis of the traveller specific transportation parameters.

The suggested one or more meeting place(s) or potential transportation path(s) are preferably suggested to increase the security rating and/or distance efficiency rating.

The suggested one or a group of companions is preferably made on the basis of the individual rating or collective ratings of the companion(s).

Preferably, the method provides that, in relation to any completed accompanied transportation, a traveller may be rated by a companion and/or a companion may be rated by a traveller and/or a companion may be rated by another companion.

In a preferred form of the invention, the individual has a status which may be adjusted by the traveller or companion to be active or inactive and/or traveller or companion, such that when the status is active the traveller or companion is able to engage in accompanied transportation and when the status is inactive the traveller or companion is not able to engage in accompanied transportation.

The method may provide for a traveller to convert their status to be a companion, either before, during or after completion of an accompanied transportation, subject to a conversion check. The conversion check preferably includes receiving the agreement from all (or a majority of) individuals that are part of any current accompanied transportation.

Preferably, the traveller destination is not precisely communicated to the one or more companion(s)

The method may include suggesting to a traveller that they separate from the one or more companion(s) at a certain location on the transportation path prior to arriving at their destination. The separation suggestion may be made where the traveller indicates in their transportation parameters a preference to hide their destination from their companion(s). The location of the separation suggestion is made on the basis of the security rating of the separation location, the security rating of the path and the distance between the separation point and destination.

Preferably, method includes the step of checking that the companion(s) separate by a predetermined distance from the traveller at a predetermined time after completion of the traveller's accompanied transportation with said companion(s).

The method includes system settings that override individual settings for parameters for accompanied transportation [e.g. minimum and/or maximum distance between companion(s) and traveller during the course of accompanied transportation].

The method according to claim 34, wherein the method includes notifying the traveller or companion if a system setting is breached [e.g. maximum distance between companion(s) and traveller].

Preferably, the rating of the traveller or companion is decreased if the system setting is breached more than a pre-determined number of times.

The method may include monitoring the location of a traveller and/or companion relative to the accepted transportation path. The location of a traveller or companion is determined via a personal device used by the traveller or companion.

The method may include the step of registering the personal devices used by each traveller and companion, and requiring that the registered personal device be kept on the person of the traveller and companion(s) at all times during the course of any agreed transportation.

The method preferably includes the step of requiring consent by each traveller and companion to provide access to their microphone and/or camera so that a recording the transportation can be made and simultaneously monitored by operators of a system executing the method.

Preferably, the consent provided by user covers consent to access real-time information from the user's personal electronic device used for accompanied transportation. The disclaimer may include accepting limited liability for the provider of the accompanied transportation services.

Preferably, the method includes the step of recording completion of an accompanied transportation.

The traveller or companion is preferably able to engage a code red alert function, the engagement of which sends an emergency signal to an emergency services operator. The code red alert function may be a safe-word that is engaged when that safe-word is recognised as being spoken by the personal electronic device of the traveller or companion.

The accompanied transportation may be conducted, in part or otherwise, by car transportation. Fees for an accompanied transportation may be levied on the traveller for the accompanied transportation service.

Fees may be payable in respect of an accompanied transportation. Fees may be payable to the companion in respect of an accompanied transportation.

The method may include documenting the accompanied transportation proposal, acceptance and travel in relation to the traveller and companion(s)

Preferably, a 'safety related parameter' or similar is intended to be a subset of other transportation parameters.

Preferably, the method includes sending a notification to a third party (e.g. family, or public authorities, etc) when a traveller nominates that they are seeking accompanied transportation (i.e. 'activates' status as a traveller). Preferably, the method includes sending a notification once accompanied transportation has commenced (i.e. at the acceptance step and/or verification step).

According to a third aspect of the invention, there is provided a computer system for connecting pre-authorised and verified individuals for accompanied transportation, the computer system including: A program memory storing program code; A processor for implementing the program code stored in the program memory; Wherein the program code comprises: Code for controlling the processor to receive input from a pre-authorised traveller, including traveller specific transportation parameters; Code for controlling the processor to receive input from one or more pre-authorised companions, including companion specific transportation parameters; Code for controlling the processor to execute a transportation optimisation step including comparing and matching the transportation parameters of the pre-authorised traveller with the transportation parameters of the one or more of the pre-authorised companion(s); Code for controlling the processor to present one or more optimised transportation proposal(s) for acceptance by the traveller, wherein the presentation of the transportation proposal(s) includes presenting one or more matched parameters for selection; Code for controlling the processor to register traveller selections and acceptance of the transportation proposal, and to upon registration, notify the traveller and the selected optimised companion(s) that the transportation proposal has been accepted; Code for controlling the processor to provide to a traveller or companion(s) at least one of the following verification means prior to or at the accepted meeting time to enable verification of the identities of the traveller and/or one or more selected optimised companion(s) when the traveller and the companion(s) meet: a visual or audio recording of the companion(s) or traveller; descriptions of the physical features of the companion(s) or traveller; ID numbers or code words assigned to the companion(s) or traveller; audio/visual data matching based on comparison of a real-time voice and/or image recording of the traveller and/or companion(s) taken by personal device of another traveller and/or companion(s), with a previously supplied voice and/or image recording of the traveller or companion(s); digital fingerprint matching based on comparison of a real-time digital fingerprint reading of one of the traveller and/or companion(s) taken by the user device of another traveller and/or companion(s); confirmation of the relative location of the other traveller and/or companion(s); an identification process provided by a third party application.

According to a fourth aspect of the invention, there is provided a computer system for connecting pre-authorised and verified individuals for accompanied transportation that is at least in part, ambulatory accompanied transportation, the computer system including: a program memory storing program code; a processor for implementing the program code stored in the program memory, wherein the program code comprises:

Code for controlling the processor to receive input from a pre-authorised traveller, including traveller specific transportation parameters;

Code for controlling the processor to receive input from one or more pre-authorised companions, including companion specific transportation parameters;

Code for controlling the processor to execute a transportation optimisation step including comparing and matching the transportation parameters of the pre-authorised traveller with the transportation parameters of the one or more of the pre-authorised companion(s), wherein the optimisation step includes an assessment of safety related parameters Code for controlling the processor to present one or more optimised transportation proposal(s) for acceptance by the traveller, wherein the presentation of the transportation proposal(s) includes presenting matched parameters for selection;

Code for controlling the processor to register traveller selections and acceptance of the transportation proposal, and to upon registration, notify the traveller and the selected optimised companion(s) that the transportation proposal has been accepted;

Code for controlling the processor to provide to a traveller or companion(s) verification means prior to or at the accepted meeting time to enable verification of the identities of the traveller and/or one or more selected optimised companion(s) when the traveller and the companion(s) meet; and Code for monitoring one or more of the safety related parameters in real-time to determine whether those parameters are satisfied.

Preferably, the program code further comprises code for effecting real-time communication with the traveller and/or companion in response to the monitored one or more safety related parameters.

According to a fifth aspect of the invention, there is provided a computer system for connecting pre-authorised and verified individuals for accompanied transportation that is at least in part, ambulatory accompanied transportation, the computer system including a server, the server including: a processor/controller; a database; at least one traveller interface and at least one companion interface;

the processor controller operatively interacting with the traveller and companion interfaces to execute steps in conjunction with the database;

wherein the server is configured to execute the steps of the method disclosed above and the step of receiving input from, presenting transportation proposal(s) to, providing verification means to, monitoring, and communicating with a traveller or companion via the at least one traveller or companion interface, respectively.

Preferably, the database contains, inter alia: traveller or companion personal information; traveller or companion location information; other data relating to a traveller or companion, such as a rating or verification related data; and/or traveller or companion specific transportation parameters.

According to a sixth aspect of the invention, there is provided a non-transitory computer-readable storage medium comprising instructions that, responsive to execution by a computer, cause the computer to implement the method disclosed above, including the step of receiving input from, presenting transportation proposal(s) to, providing verification means to, monitoring and communicating with a traveller or companion via at least one traveller or companion interface, respectively.

The features described in relation to one or more aspects of the invention are to be understood as applicable to other aspects of the invention. More generally, combinations of the steps in the method of the invention and/or the features of the system of the invention described elsewhere in this specification, including in the claims, are to be understood as falling within the scope of the disclosure of this specification.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIGS. 6A, 6B, 6C, 6D, 6E, 6H and 6I are a series of schematic representations of traveller and companion interface screens relating to a third accompanied transportation scenario outlined in the description.

FIGS. 6F, 6G and 6J are a series of schematic representations of arrangements where the location and relative position of parties to the third accompanied transportation scenario is determined.

DETAILED DESCRIPTION

Figure 1:
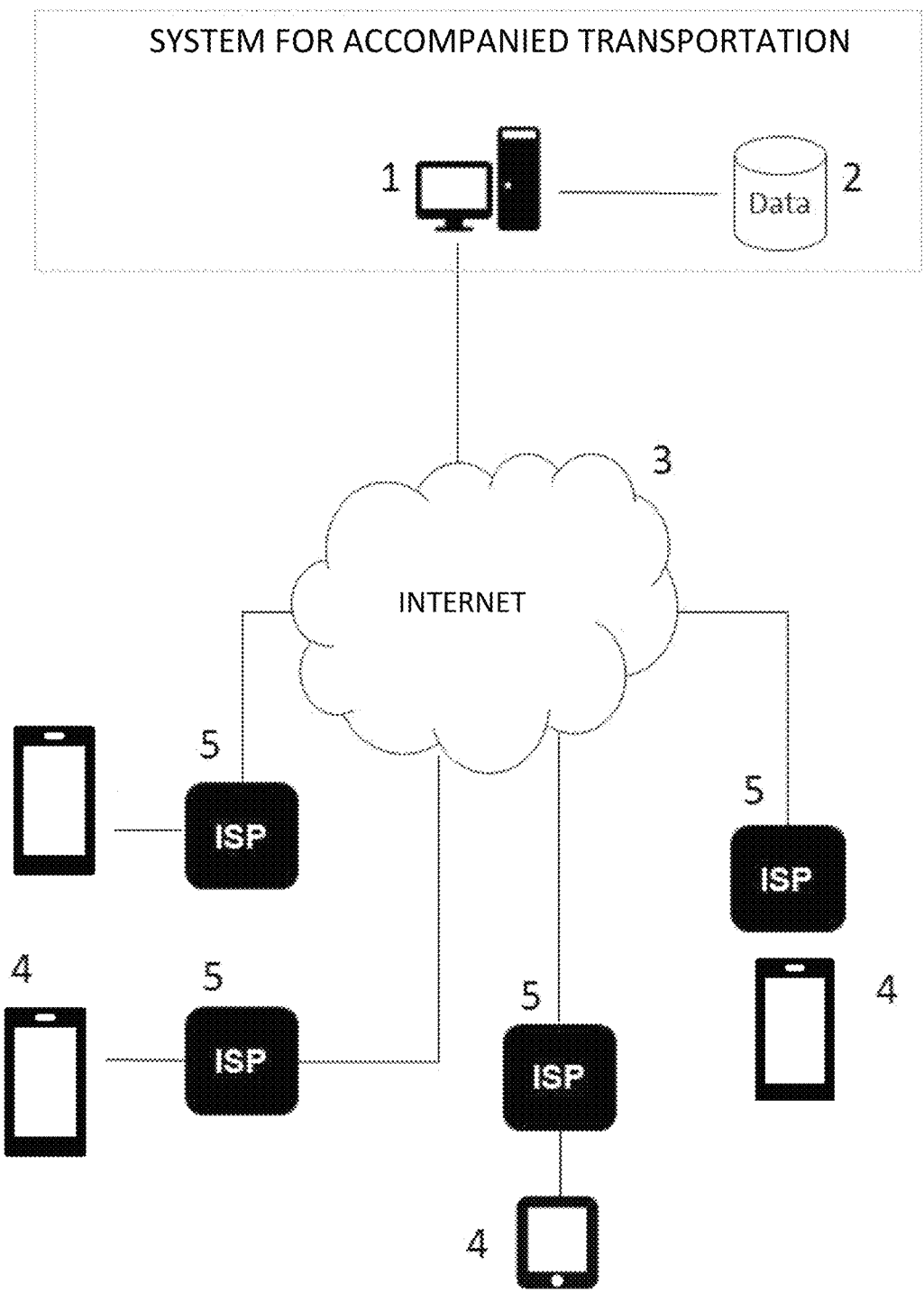
FIG. 1 is a schematic diagram of hardware components of a system according to a preferred embodiment of the present invention.
Figure 1A:
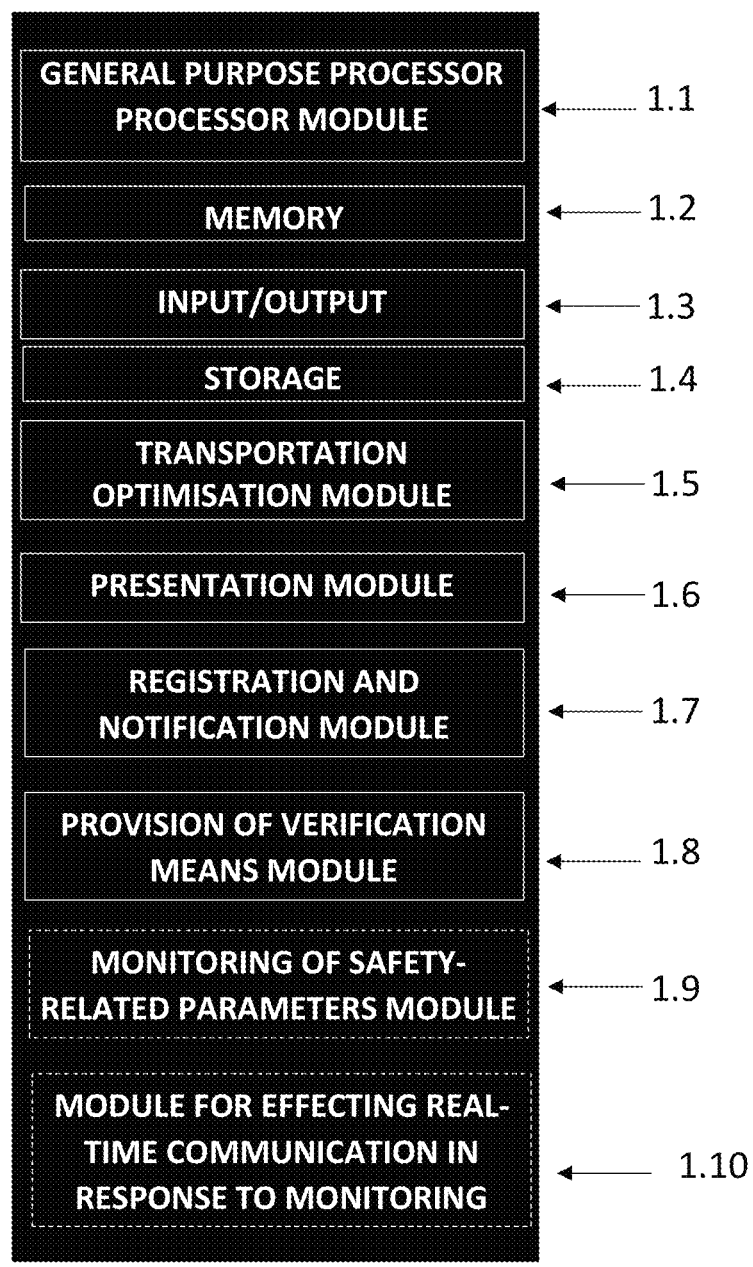
FIG. 1A is a schematic diagram of hardware components of an example server for administering accompanied transportation.
Figure 2:
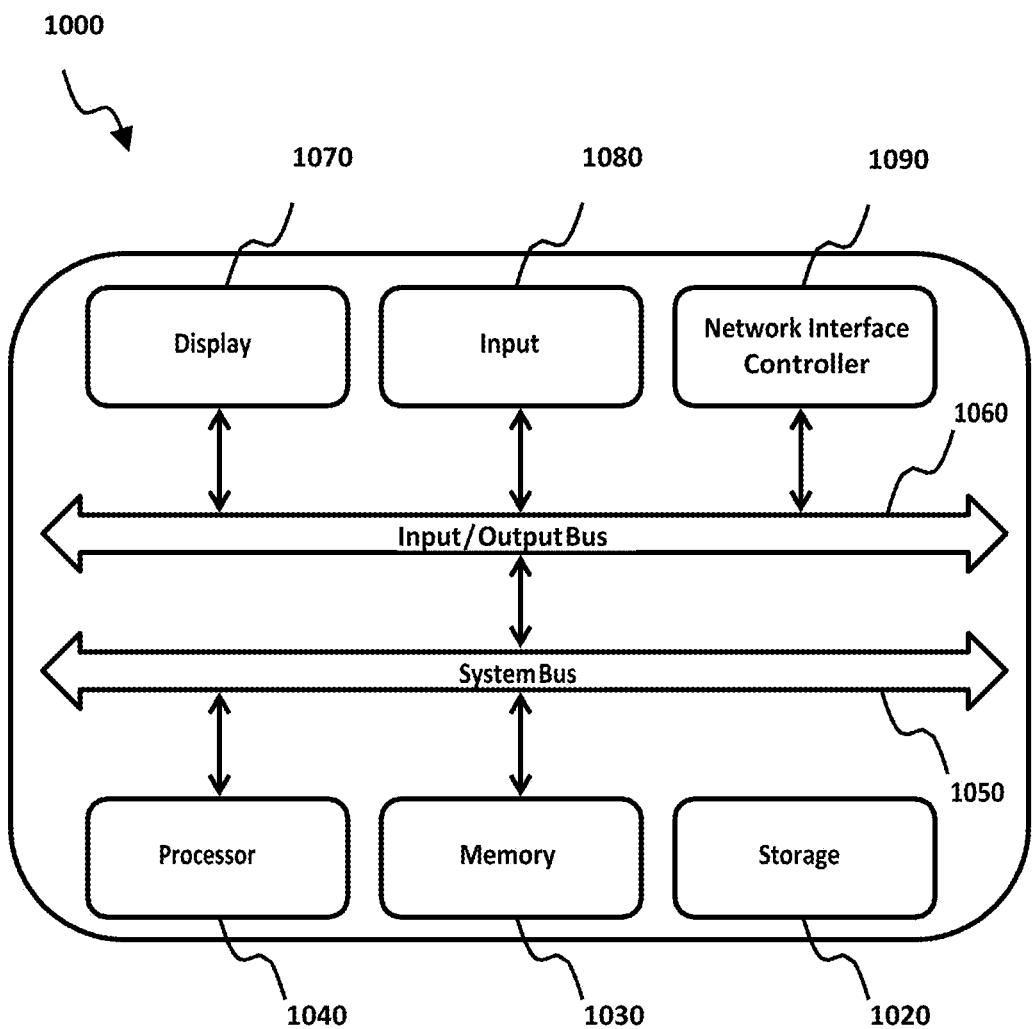
FIG. 2 is a schematic diagram of a generic hardware architecture—at the physical level—that can be generally used to implement hardware components of FIG. 1.

FIG. 1 is a is a schematic diagram of hardware components of an example system for connecting pre-authorised and verified individuals for accompanied transportation. FIG. 1A depicts the server of FIG. 1. FIG. 2 is a schematic diagram of a generic hardware architecture—at the physical level—that can be generally used to implement hardware components of FIG. 1 and FIG. 1A. FIGS. 1, 1A and 2 are described in more detailed below.

Server Overview

FIG. 1 depicts hardware components—that is, at the physical level—of a server 1 as described herein. The server 1, contains the processor 6 for performing the steps of the method. As an example, the server 1 may be a server machine running a Microsoft Windows™ operating server, connected to a back office database 2, for example a SQL relational database server.

The server 1 is connected to the Internet 3. The server is accessed over the Internet 3 by a plurality of user devices 4, in the context of the embodiments described these are expected to be mobile phones, tablets or wearable mobile devices and using fixed or mobile broadband, wireless hotspots, satellite or dial-up connections through respective Internet Service Providers 5. Access to the server 1 is restricted by, for example, a firewall and other known network security measures. The server 1 includes a web server, for example the Microsoft IIS™ web server, to serve web page requests. User interaction is permitted through screens for actions displayed on a web page.

Physical Hardware—Server and User Devices

As is now described for completeness, embodiments described and depicted herein rely upon various computing platforms used to implement the client-server architecture described particularly in connection with FIG. 1, arranged to interoperate via the Internet 3. Implementation is dependent upon development and deployment of interoperating computer programs able to be executed within respective selected computing platforms and their accompanying operating systems.

With reference to FIG. 1A, there is depicted a server 1, including the processor 1.1 of the accompanied transportation server 1 which, once traveller and companion related input has been received in the input/output module 1.3 (data may be received from the data input in to the personal electronic devices of individuals; or sourced from the storage 1.4, for example security related information about locations or transportation paths, in response to traveller or companion data input), undertakes the steps of performing transportation optimisation in the transportation optimisation module 1.5 including comparing and matching transportation parameters. The transportation optimisation module processes the data received to order a plurality of transportation proposals for presentation by the presentation module 1.6, including presenting one or more matched parameters for selection. The server then, in the registration and notification module, 1.7, registers traveller selections and acceptance of the transportation proposal, and notifies the traveller and the selected optimised companion(s) that the transportation proposal has been accepted; next, the verification means module 1.8 ensures that the verification means is provided to each party to an accepted accompanied transportation; and then, during the course of the accompanied transportation, the monitoring module 1.9 monitors, in real-time, one or more safety related parameters to determine whether they are satisfied; and the communication module effects communication with the traveller and/or companion in relation to the monitored one or more safety related parameters.

FIG. 2 depicts an architecture of a computer system 1000 in schematic form, representative of a generic computing platform suitable for implementing the described system. This architecture abstracts the physical-layer hardware details, which are differently implemented across manifestations of the server 1 and user devices 4.

The computer system 1000 includes in its principal components a storage 1020, a memory 1030 and a processor 1040, each of which is interconnected via a system bus 1050. The system bus 1050 is linked to an input/output bus 1060, which interfaces with a display 1070, input 1080, and a network interface controller 1090. The network interface controller 1090 is configured to permit intercommunications with a network external of the computer system 1000.

The storage 1020 provides a non-volatile data storage medium for storing application data and executable code, and is typically flash memory, or other data storage device such as a magnetic hard disk drive. The memory 1030 is a random-access memory used to load executable code and application data from storage 1020.

The processor 1040 executes instructions of a computer program loaded from memory 1030 by performing the basic arithmetic, logical, control and input/output (I/O) operations specified by the instructions. The processor 1040 includes at least a central processing unit, and may be supported by ancillary processing units for performing specialist functions—such as dedicated graphics processing.

The display 1070 provides a visual window to a user, who can interact via input 1080. The input 1080 in the example of a personal computer or workstation includes a keyboard and mouse. Alternatively, in the case of a tablet or smartphone the input 1080 includes a touchscreen layered over the display 1070, and responsive to input gestures.

The network interface controller 1090 provides a port for the computer system 1000 to communicate by transmitting data to and receiving data from a network (not shown, though will be the Internet 3), and implements electronic circuitry required to communicate using a specific physical layer and data link layer standard.

The network interface controller 1090 is configured to interoperate using wired standards such as Ethernet or Token Ring, or wireless standards such as provided by the IEEE 802.11 Wi-Fi standard, or other cellular standard. This provides a base for a full network protocol stack, which permits large-scale network communications through routable protocols, such as Internet Protocol (IP) over the Internet 3. Connection to the Internet is typically mediated via a firewall server or proxy server.

The client-software architecture implements a particular software design and architecture, distributed amongst both server 1 and user devices 4. Processing is conducted co-operatively as required though principally at the server 1, with some minimal processing executed at the user devices 4, and local data caching and synchronisation with the server 1.

An application at the user device 4 includes, a presentation layer, or user interface, an application layer, and a data layer is implemented by computer programs installed and executing are deployed. Software implemented at the server 1 includes one or more server programs executing by the server 1 within the server operating system.

These server programs implement domain logic, which encodes how data can be created, displayed, stored, and changed, as contrasts with the remainder of the software comprising application logic which is primarily concerned with lower-level details of managing a database or displaying the user interface, system infrastructure, or generally connecting various parts of the program.

Software implemented at the user devices 4 vary according to computing platforms, but may be implemented as stand-alone apps (for smartphone or tablets, which tend to rely upon a touchscreen for input) under mobile operating systems or, possibly, stand-alone applications (for laptops or personal computers) under desktop operating systems. Regardless of the computing platform, dedicated web browsers can be used to implement a web application via scripting executed by the web browser, under both mobile or desktop operating systems.

Selection of suitable channels for delivery of client software, and favoured environments and frameworks for development is informed by technical requirements and developer skill set. Regardless, client software is designed to present a user interface and application logic, as described in further detail herein.

Figure 3A:
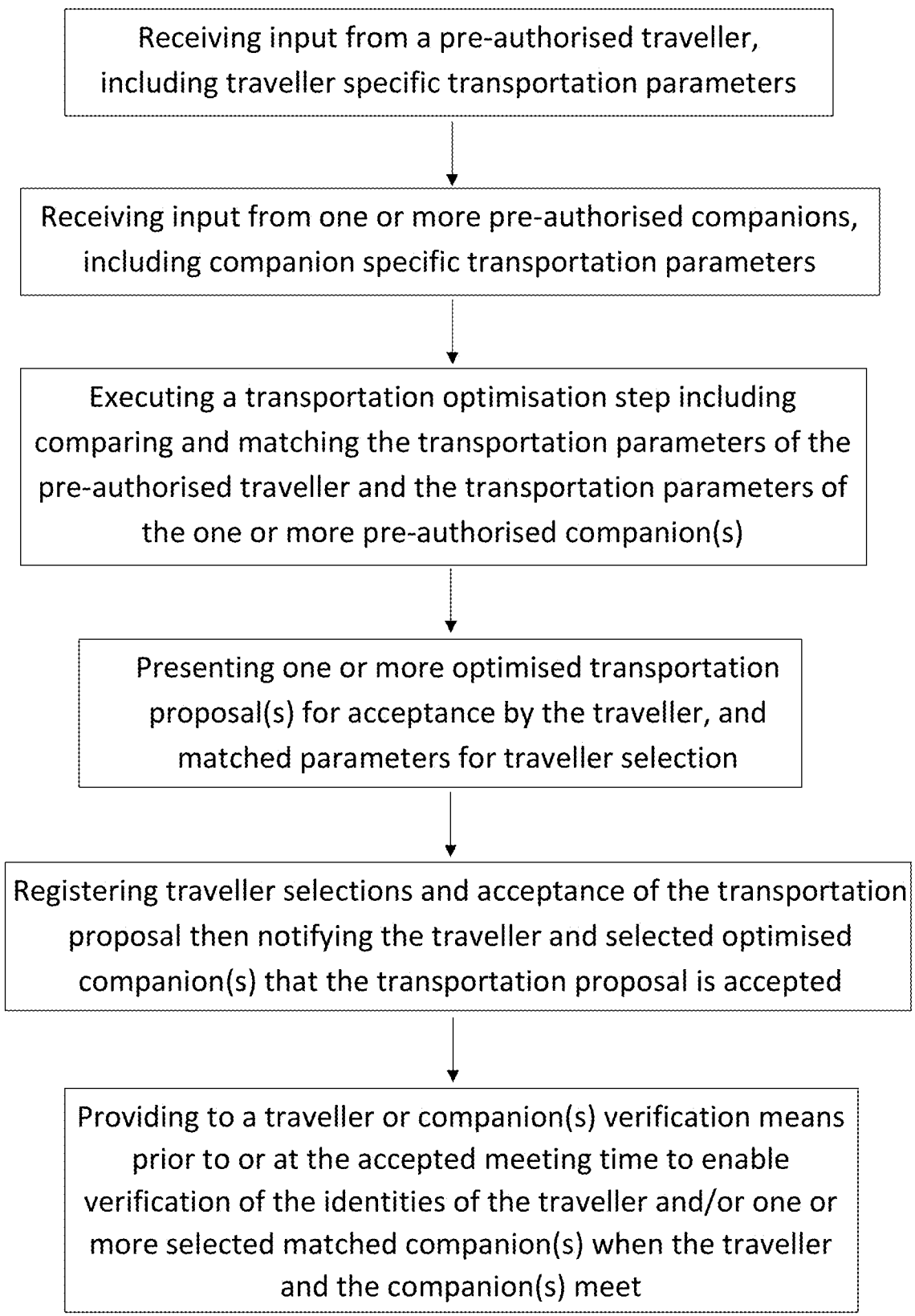
FIG. 3A and FIG. 3B are each process flowcharts depicting steps involved in implementation of a preferred method of the invention by the server of FIG. 1
Figure 3B:
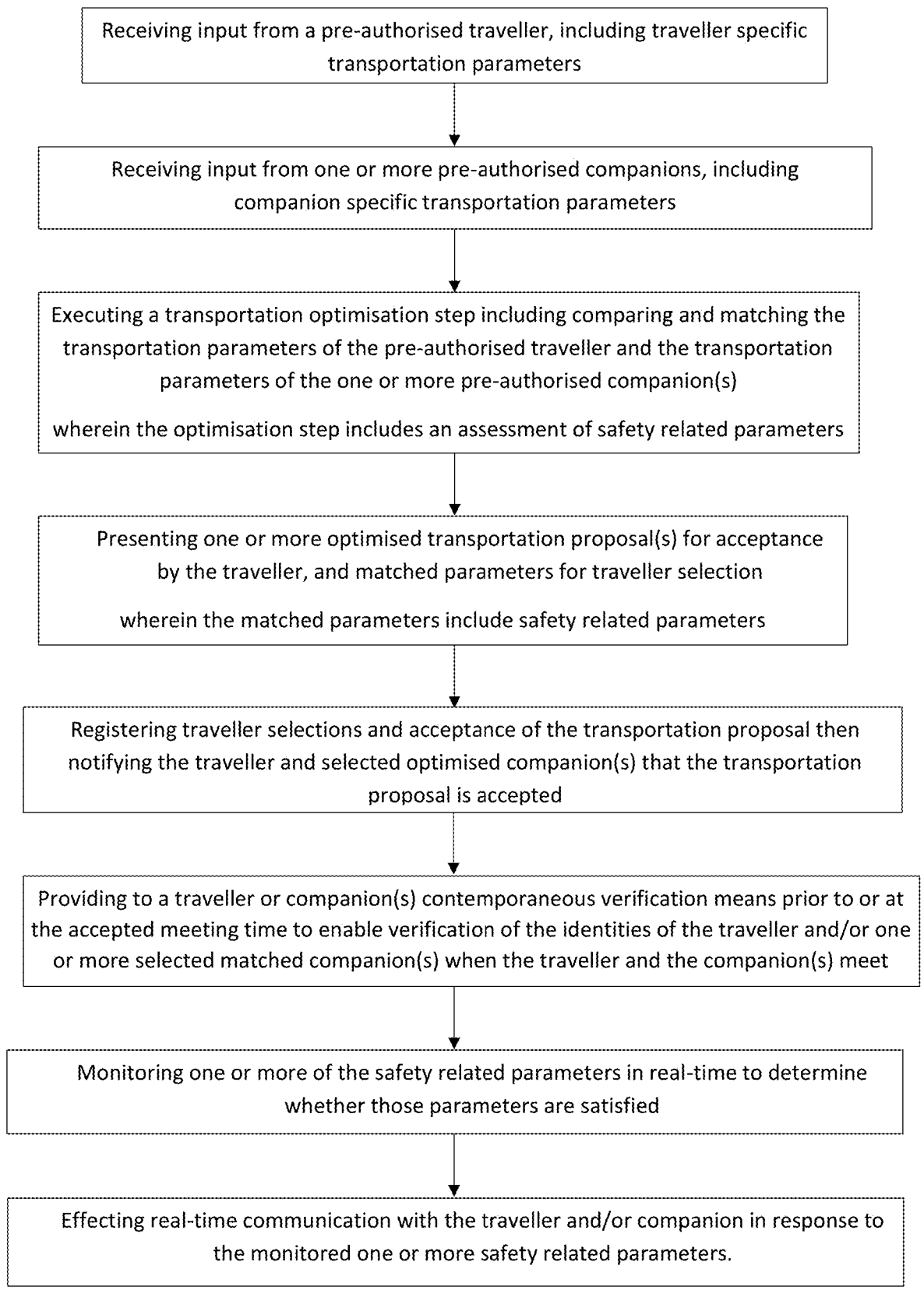

FIGS. 3A and 3B are each process flowcharts depicting steps involved in implementation of a preferred method of the invention by the server of FIG. 1, including receiving input from a pre-authorised traveller, including traveller specific transportation parameters; receiving input from one or more pre-authorised companions, including companion specific transportation parameters; executing a transportation optimisation step including comparing and matching the transportation parameters of the pre-authorised traveller and the transportation parameters of the one or more pre-authorised companion(s); presenting one or more optimised transportation proposal(s) for acceptance by the traveller, and matched parameters for traveller selection; registering traveller selections and acceptance of the transportation proposal then notifying the traveller and selected optimised companion(s) that the transportation proposal is accepted; and providing to a traveller or companion(s) verification means prior to or at the accepted meeting time to enable verification of the identities of the traveller and/or one or more selected matched companion(s) when the traveller and the companion(s) meet. FIG. 3B additionally includes assessment of one or more safety related parameters in the optimisation step, and one or more safety related parameters are included in the matched parameters; FIG. 3B also specifically includes the step of monitoring the safety related parameters of an accompanied transportation in real-time to determine whether each of those parameters are satisfied, and effecting communication with a traveller or companion in relation to same.

Figure 4:
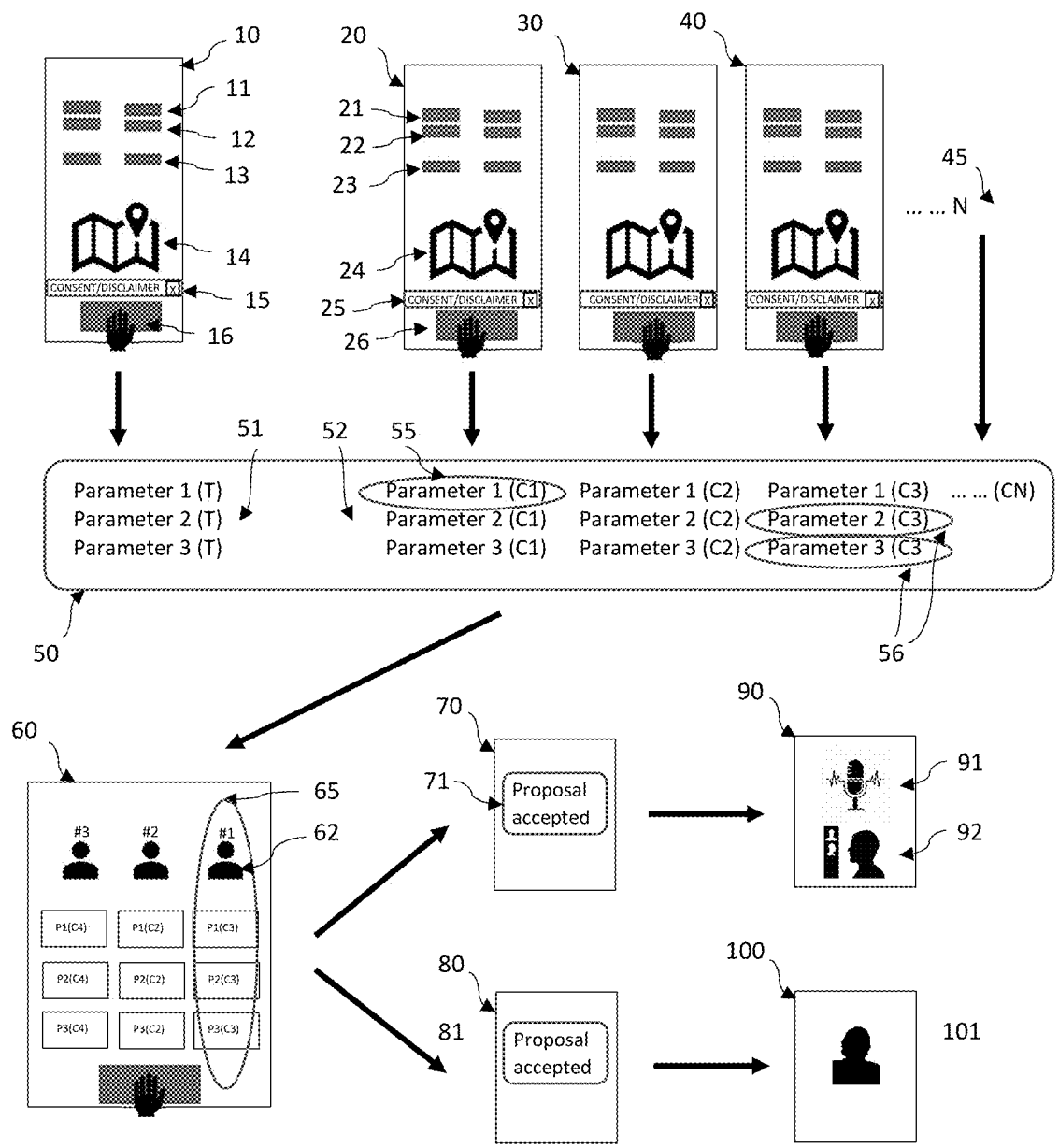
FIG. 4 is a series of schematic representations of traveller and companion interface screens and an optimisation engine relating to a first accompanied transportation scenario outlined in the description
Figure 5:
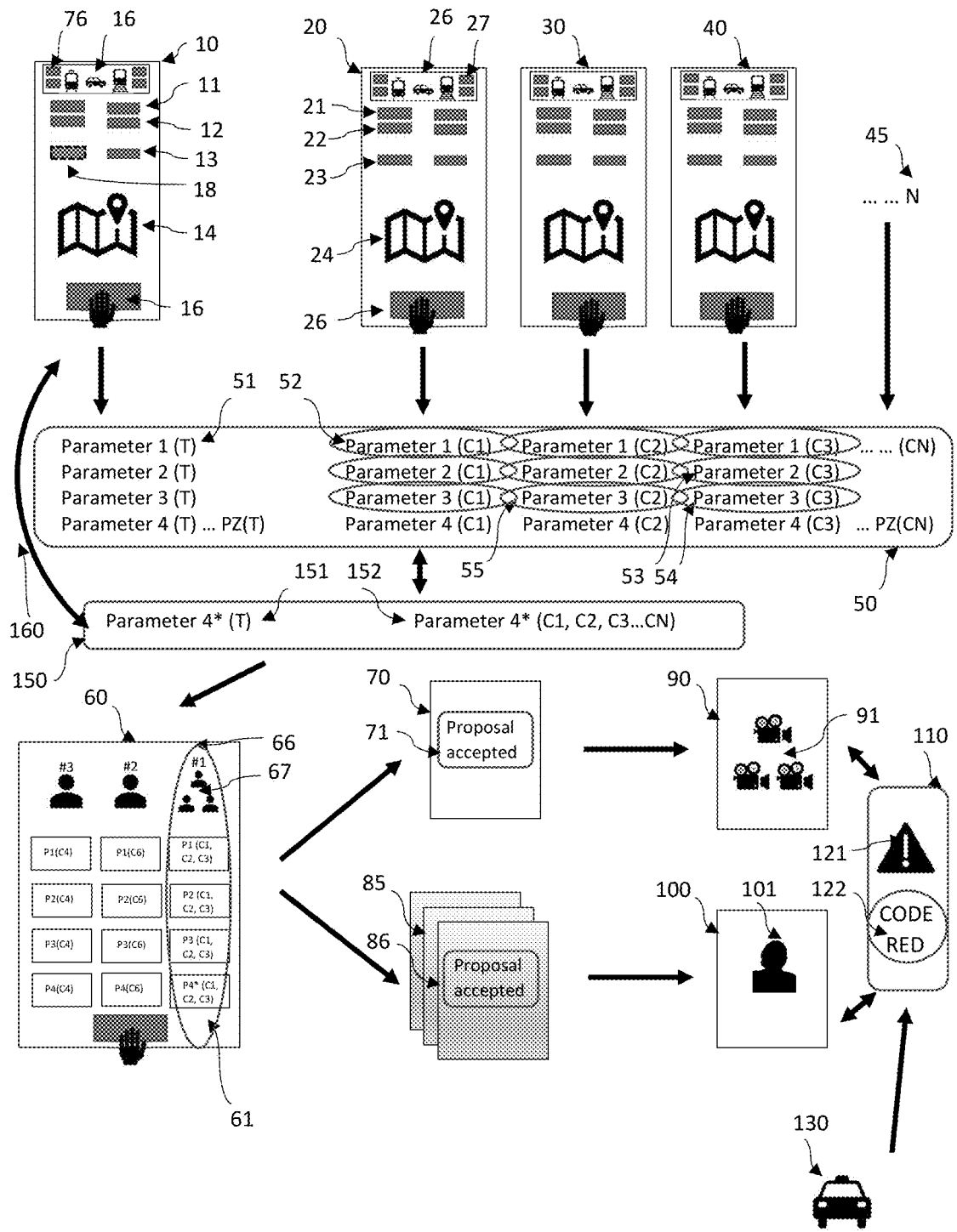
FIG. 5 is a series of schematic representations of traveller and companion interface screens and an optimisation engine relating to a second accompanied transportation scenario outlined in the description

With reference to FIGS. 4 and 5, there are depicted simplified schematic diagrams of example interface screens on traveller and companion electronic devices (not shown) for enabling the receiving of input from a traveller (10) and a plurality of potential companions (20, 30, 40, 45), presenting transportation proposals (60), notifying the traveller and selected companion (70, 80), and providing verification means to the traveller and selected companion (90, 100). There is also depicted the flow sequence between relevant screens as well as a representation of the functional interplay of an optimisation engine 50.

In more detail, a method of the invention according to the embodiment in mobile application form presented in FIG. 4 includes receiving input via the interfaces in the form of traveller specific transportation parameters including a meeting time (or meeting time window) 11, a meeting place 12, and a destination 13. Input is able to be received in a text box employing a predictive text based mechanism that enables more ready insertion of text signifying the parameter. Alternatively, the meeting place and/or destination can be selected on an interactive electronic map 14. Optionally, in addition to the destination, the traveller may choose their preferred travel path, by indicating same on the electronic map 14 on the interface. The traveller must elect to agree to the consent/disclaimer by marking a box 15 to confirm they have read and agree to the terms and conditions for use of the mobile application, and in particular that the traveller is providing consent to engage in accompanied transportation and nothing more. Once the consent/disclaimer box has been marked, the traveller can proceed by clicking the 'proceed' button 16, which enables the input traveller specific parameters to be sent to the optimisation engine for processing.

FIG. 4 further depicts receiving input in the form of companion specific transportation parameters including an acceptable meeting time(s) (or meeting time window(s)) 21, acceptable meeting place(s) or area(s) 22, and acceptable destination(s) or destination area(s) 23. Input is able to be received in a text box employing a predictive text based mechanism that enables more ready insertion of text signifying the parameter. Alternatively, the meeting place(s), meeting area(s), destination(s) and/or destination area(s) can be selected on an interactive electronic map 24 on the interface. The traveller must elect to agree to the consent/disclaimer by marking a box 25 to confirm they have read and agree to the terms and conditions for use of the mobile application, and in particular that the traveller is providing consent to engage in accompanied transportation and nothing more. Once the consent/disclaimer box has been marked, the companion can proceed by clicking the 'proceed' button 26, which enables the input traveller specific parameters to be sent to the optimisation engine for processing.

In FIGS. 4 and 5, there are a total N potential companions, and a companion is represented by the letter 'C'. A traveller is represented by the letter 'T'. It will be appreciated that the input from companions received in interface screens 30 (for the second companion, C2), 40 (for the third companion, C3) and 45 (for the remaining N-3 companions, C4 to CN) is also received.

In FIG. 4, for illustration purposes only three parameters are input by the traveller and the companions C1-CN, namely in relation to meeting time, meeting place and destination. It will be appreciated that different parameters may be provided, and more than three parameters may be input by either the traveller or the companions.

After input has been received, the method executes a transportation optimisation step using optimisation engine 50 which includes comparing and matching the transportation parameters of the pre-authorised traveller 51 (corresponding to inputs 11, 12, 13) with the transportation parameters of the pre-authorised companions, 52 (corresponding to inputs 21, 22, 23 received from each of companions C1, C2, C3, . . . CN, where N is the total number of companions that are actively engaging in accompanied transportation). In this example, the optimisation engine applies a linear regression analysis approach to select the companion parameters which most closely match the traveller parameters: here, the third companion C3 has two closest compared parameters (Parameter 2(C3) and Parameter 3(C3)) to the equivalent Parameters for the traveller (Parameter 2(T) and Parameter 3(T)) and so these are selected in a matching action 56 which prefers the third companion over the other companions. This is because first companion C1 has only one closest compared parameter (Parameter 1(C1)) and companions C2 and C4-CN have no closest compared parameter. Parameter matching approaches that may be used in the optimisation step in the method, include non-linear regression, tree-based methods (e.g. bagging, boosting and random forest) or support vector machines (e.g. finding a hyperplane in an n-dimensional model where n is the number of traveller and companion parameters to be matched).

After the optimisation step is completed, the traveller is presented transportation proposal screen 60, which presents three different proposals in ranked order corresponding to the best match of traveller and companion parameters, for selection by the traveller. The traveller in this example selects 65 the #1 ranked companion 62, having companion specific parameters represented by abstract symbols P1(C3), P2(C3) and P3(C3) which correspond in aggregate most closely (compared with the parameters of other potential companions) to the traveller specific parameters regarding meeting place, destination and meeting time. After selecting, the traveller and the selected companion receive notification screens (70 and 80, respectively) notifying them that the accompanied transportation proposal has been accepted via notifications 71 and 72, respectively. The traveller and selected companion then proceed to the accepted meeting place to meet in accordance with the accepted transportation proposal. Before the agreed meeting time, each of the traveller and selected companion are provided verification means to permit real-time verification of each other. In the example in FIG. 4, the traveller is provided via their personal electronic device (not shown) an audio recording 91 of the companion and a passport quality photo headshot 92 of the selected companion to enable them to verify their selected companion at the meeting place.

Likewise, the selected companion is provided via their personal electronic device (not shown) a headshot of the traveller to enable them to verify the traveller at the meeting place.

With reference to FIG. 5, in addition to receiving input, presenting transportation proposals, the notification process and provision of verification means provided in FIG. 4, additional features and steps are depicted in simplified schematic diagrams of example interface screens on traveller and companion electronic devices (not shown). An additional flow sequence for further operation of optimisation engine 50 is also depicted, as well as other emergency or safety communication steps.

In more detail, a method of the invention according to the embodiment in mobile application form presented in FIG. 5 includes receiving input via the interfaces in the form of traveller specific transportation parameters including a meeting time (or meeting time window) 11, a meeting place 12, and a destination 13. Input is able to be received in a text box employing a predictive text based mechanism that enables more ready insertion of text signifying the parameter. Alternatively, the meeting place and/or destination can be selected on an interactive electronic map 14. Optionally, in addition to the destination, the traveller may choose their preferred travel path, by indicating same on the electronic map 14 on the interface. Additionally, the traveller is able to insert a companion preference (i.e. the gender or group) via input 18. This input 18 is weighted by the traveller—this is indicated diagrammatically by the dashed line around the input box so that only companions having the companion preference of all female groups of three or more are presented in the proposal step (see below).

The traveller must elect to agree to the consent/disclaimer by marking a box 15 to confirm they have read and agree to the terms and conditions for use of the mobile application, and in particular that the traveller is providing consent to engage in accompanied transportation and nothing more. Once the consent/disclaimer box has been marked, the traveller can proceed by clicking the 'proceed' button 16, which enables the input traveller specific parameters to be sent to the optimisation engine 150 for processing.

FIG. 5 further depicts receiving input in the form of companion specific transportation parameters including an acceptable meeting time(s) (or meeting time window(s)) 21, acceptable meeting place(s) or area(s) 22, and acceptable destination(s) or destination area(s) 23. Input is able to be received in a text box employing a predictive text based mechanism that enables more ready insertion of text signifying the parameter. Alternatively, the meeting place(s), meeting area(s), destination(s) and/or destination area(s) can be selected on an interactive electronic map 24 on the interface. The traveller must elect to agree to the consent/disclaimer by marking a box 25 to confirm they have read and agree to the terms and conditions for use of the mobile application, and in particular that the traveller is providing consent to engage in accompanied transportation and nothing more. Once the consent/disclaimer box has been marked, the companion can proceed by clicking the 'proceed' button 26, which enables the input traveller specific parameters to be sent to the optimisation engine for processing.

Additionally, the traveller (and companion(s)) is presented a mode of transportation input 17 (27) based on the assessment of real-time traveller (and companion) location information. Alternatively, the traveller or companion can just insert the relevant specification transportation information to locate them on a particular vehicle. In the example interface 10 (and 20), the traveller (companion) is presented train, tram and car modes, with the train and tram modes each having train or tram specific information (e.g. line and direction of travel, the carriage that the individual is located), for selection. In the current example, a train and a tram line, as well road transportation are in close proximity to the location of the traveller and companion and so the interface 10, 20 presents the three modes for selection. Alternatively, only one mode may be presented to the traveller or companion where only one mode is recognised based on the real-time location information.

In FIG. 5, for illustration purposes only four parameters are input by the traveller, and three parameters input by the companions C1-CN. Three common parameters are input be each traveller and companion, namely in relation to meeting time, meeting place and destination. It will be appreciated that different parameters (e.g. security rating or a distance efficiency rating, the latter using a combination the total accompanied transportation distance, distance from the location of individual to the meeting place and/or back to the original location) or greater numbers of parameters (e.g. 8 or 9) may be may be input by either the traveller or the companions. Additionally, traveller or companion weighting may be applied to a plurality of parameters, and in varying orders or amounts (e.g. expected duration of accompanied transportation must (i.e. 100%) be 10 minutes or less and/or total distance travelled is strongly preferred (i.e. 90%) to be no more than 1 km such that journeys over 1.1 km will not generate a match).

After input has been received, the method executes a transportation optimisation step using optimisation engine 50 which includes comparing and matching the transportation parameters of the pre-authorised traveller 51 (corresponding to inputs 11, 12, 13, 18) with the transportation parameters of the pre-authorised companions, 52 (corresponding to inputs 21, 22, 23 received from each of companions C1, C2, C3, . . . CN, where N is the total number of companions that are actively engaging in accompanied transportation). In this example, the optimisation engine applies an SVM approach to select the companion parameters which most closely match the traveller parameters: here, the three companions C1, C2 and C3 each have three closest compared parameters (Parameter 2 (C1, C2, C3), Parameter 3 (C1, C2, C3) and Parameter 4 (C1, C2, C3) to the equivalent Parameters for the traveller (Parameter 2(T), Parameter 3(T) and Parameter 4(T)) and so these are selected in a matching action 53, 54, 55 which prefers the three companion C1, C2, C3 over the other companions. This is because the other companions C4-CN do not have closer matching combination of parameters when the SVM method is applied.

In the scenario depicted FIG. 5, the traveller has provided transportation parameters corresponding to a request for accompanied transportation for a train trip. The traveller has just boarded a particular train, and companions C1-C3 (two females and one male travelling in a group) are each on the same train as the traveller, and planning to get off at the same stop as the traveller.

After the optimisation step above is undertaken, the method includes suggesting to the passenger a modification to their preference for having a group of all three or more female companions (P4(T)) 18, weighted to be mandatory, to accept group of two females and one male (P4*(T)). The passenger accepts this in further optimisation step 160.

After the optimisation and further optimisation step 160 is completed, the traveller is presented transportation proposal screen 60, which presents three different proposals in ranked order corresponding to the best match of traveller and companion parameters, for selection by the traveller. The traveller in this example selects 66 the #1 ranked companion corresponding to the group of companions C1-C3, 67, having companion specific parameters represented by abstract symbols P1(C1, C2, C3), P2(C1, C2, C3), P3(C1, C2, C3) and P4*(C1, C2, C3) which correspond in aggregate most closely (compared with the parameters of other potential companions) to the traveller specific parameters regarding meeting place (P1), destination (P2), meeting time (P3), and revised group and gender preferences (P4*). After selecting, the traveller and the selected companions receive notification screens (70 and 85, respectively) notifying them that the accompanied transportation proposal has been accepted via notifications 71 and 86, respectively. The traveller and selected companions then proceed to the accepted meeting place to meet in accordance with the accepted transportation proposal (e.g. the first carriage of the 9.30 pm train on the bayside line heading towards central station). Before the agreed meeting time, each of the traveller and selected companions are provided verification means to permit real-time verification. In the example in FIG. 5, the traveller is provided via their personal electronic device (not shown) an audio-visual recording 91 of each of the companions to enable them to verify their selected companions at the meeting place. Likewise, the selected companions are provided via their personal electronic device (not shown) a headshot 101 of the traveller to enable them to verify the traveller at the meeting place.

Additionally, there is provided an alert notification means 110 to the personal electronic device of the traveller including presenting alerts to the traveller 121 (e.g. if the companion is beyond the maximum distance which the traveller has set for companions during accompanied transportation) and receiving a code red signal from the traveller (e.g. the traveller saying a pre-designated code red alert word that is recognisable by their personal electronic device) and optionally notifying an emergency response team which includes sending a notification of the details of the accompanied transportation to the local police or other emergency services.

With reference to FIGS. 6A-6E, 6H and 6I, there are depicted simplified schematic diagrams of example interface screens on traveller and companion electronic devices, in relation to a particular scenario of accompanied transportation. There are also depicted simplified schematics that show monitoring of the location and/or relative proximity of parties during the course of an accompanied transportation.

In the scenario the subject of FIGS. 6A-6J, there is a single traveller T, and five potential companions, referred to as C1 to C5, respectively.

The traveller is currently located in a private residence, and seeking to return home to her apartment some distance away. The private residence is equidistant between a tram stop and a train stop, both of which are currently being serviced by local public transport, and both of which may be used on the journey home. The traveller inputs in her traveller transportation parameters into the accompanied transportation interface on her electronic device—see FIG. 6A, including a request to take the highest security route home in all relevant parameters (e.g. meeting place 211, transportation path 212, waiting time 213, requiring that the companion provide maintained verification 214, mode of transport 215, the recommended minimum/maximum distance between traveller and companion 216, requirement that companion satisfy a separation request within the recommended separation parameters for high security 217). The traveller neglects to enter in the preferred rating for her potential companions, so the system prompts her to enter this in—see tab 218 which is highlighted in FIG. 6A—which she does, and then all the highest security ratings available are now chosen for each of the safety related travel parameters.

The traveller and companions C1 to C4 are, by coincidence, each returning to their respective home addresses, which happen to be in neighbouring apartment buildings.

Two of the companions, C1 and C2, each have separate plans to travel by train (including plans to depart the train at a stop closest to their respective apartment homes), and will soon board a train located one stop away from the train stop nearest to the traveller. Their travel plans are known based on data they have input into their personal electronic devices (smart phones—not shown), including data input into a third party map application (i.e. their destination, and selected mode of travel which includes walking and train), and based on the map application's suggested travel path home, which they are each currently following. The Companions C1 and C2 have each agreed that this data in the map application may be shared, so the system administering the accompanied transportation can access all relevant information held by the third party map application. However, companions C1 and C2, having previously provided accompanied transportation, and although they have agreed to be notified by the system in respect of potential future accompanied transportations, they do not currently have their companion status set to 'active' (i.e. they forgot to do this).

Another two of the potential companions, C3 and C4, have selected in their companion specific parameters that they are travelling in a group and have set their status to 'active'. C3 and C4 are travelling on a tram that will pass by the relevant tram stop which is nearest to the traveller.

The system administering the accompanied transportation is able to recognise the location and current mode of vehicular transportation of C3 and C4 on the basis of a combination of GPS signals on their personal electronic devices cross-checked with the tram timetable, and a Wi-Fi signal on the tram to which they have each connected their personal electronic device.

The final companion C5 has activated their companion status, and they have indicated in their companion transportation parameters that they will be walking in the general direction that the traveller is travelling, but not starting that journey for an hour (not shown).

The system performs an initial optimisation step, during which potential but currently 'inactive' companions C1 and C2 are identified as being the best match for the traveller parameters entered by the traveller—they have the highest two companion ratings of all potential companions and they have plans to travel on the highest security mode of transport (in this scenario, trains have the highest rating because they are comprehensively monitored by a well-regarded state operated CCTV network).

Notification of C1 and C2

Before they get on the train, C1 and C2 are each sent a message requesting whether they will set companion status to 'active' to receive an accompanied transportation proposal. They each accept this request.

C1 and C2 then enter in their companion specific transportation parameters, including confirming that they each agree to the terms of providing accompanied transportation (AT) 221, confirming each of their intended transportation path 222, and that they are proposing to travel on the train 223 (see FIG. 6B). C1 and C2 are also prompted as to whether they will agree to join together as a group of companions to provide the accompanied transportation 224. They each agree to this.

While C1 and C2 are entering in their companion specific transportation parameters, the system confirms that they each agree to the terms of providing accompanied transportation (AT) 226, their intended transportation path 227, that they are proposing to travel on the tram 228, the particular tram that they are travelling on 229, and that they are travelling as a group of two companions 230 (see FIG. 6C).

Given the information input by the companions C1 and C2 is the same, markings in relation to that information is labelled on the schematic corresponding to C1 only; similarly, given the information input by the companions C3 and C4 is the same, markings in relation to that information is labelled on the schematic corresponding to C3 only;

Detailed Transportation Optimisation Step

The transportation optimisation step (not shown, but see FIG. 5, for example), compares and matches the transportation parameters of the companions C1-C5 and the traveller T, and then presents three optimised transportation proposals 264 to 266 for acceptance, including matched safety related parameters (e.g. 270 for the train). C1 and C2 have are the recommended selection 267, as they will be taking the highest security mode of transportation, and have the highest two ratings of any of the companions C1 to C5, the highest rank option regarding other safety related parameters (e.g. C1 is a verified off-duty police officer 271), and relative to the walking route for C3 and C4, C1 and C2 have a walking route that is safer 272 (see explanation below).

It is noted that in this scenario the traveller is assessed by the administering system as a safe location, and it is further assessed that it is equally safe to travel to either the train or the tram stop (though the train stop is better monitored by CCTV), and it would take equally long to travel by foot to each of the train or tram stops (it is not far). It is also noted that the administering system assesses the security of the walking route to the traveller's home apartment after the end of communal vehicular transportation; the assessment is that it is more secure to get the train as it involves a short amount of waking distance and time (i.e. from the train stop to the traveller apartment), and the walking route from the train station is through a built up area in a safe neighbourhood. On the other hand, the walking route from the tram stop involves a long walk through a poorly lit parkland area. These assessments are able to be made, in part, based on the prior data input from parties to previous accompanied transportations. The details of such safety related parameter assessments are not provided to the traveller for selection, per se, but they constitute part of the optimisation step and are assessments made in making a recommendation to the traveller as to which accompanied transportation proposal to accept, based on the traveller's request for the highest security option.

In this scenario, it is noted that the tram that companions C3 and C4 are on, is due to reach the relevant tram stop at approximately the same time that the train that C1 and C2 are due to be on will reach the relevant train stop (i.e. waiting times for each accompanied transportation would be about the same). The system administering the accompanied transportation is able to recognise the timing and modes of transportation of C1 to C4 due to data from GPS-based interaction via satellites 280, and Assisted-GPS-based interaction via mobile phone towers 281, with their personal electronic devices cross-checked with the tram and train timetables 282 (see FIG. 6F), and a Wi-Fi signal on the tram and train to which they have each connected their personal electronic device (C1 and C2 are now their train).

The recommended proposal is accepted by the traveller 231 and companions C1 and C2, 232 and 233, respectively in FIG. 6E, with the relevant notifications sent.

Verification means are also provided to the traveler in respect of companions C1 and C2, and companions C1 and C2 each obtain verification means in respect of the traveler (see, for example, FIG. 5).

Meeting of Parties, Transportation by Train

After the proposals are accepted, the parties to the accompanied transportation meet on the train (there is a notification provided to the traveler in advance in relation to the carriage on which the companions are located, once this is determined), and the companions locate themselves two rows behind the traveler on the train, see FIG. 6G. The system administering the accompanied transportation monitors that each of the traveler T and companions C1, C2 are located together in the one carriage on the train—see FIG. 6F. Monitoring of the accompanied transportation in the train is achieved in the same way as described above in respect of the locating of companions C1 to C4 on their respective modes of public transport, though it is noted that, as depicted in FIG. 6G, monitoring Bluetooth® signal strength 285 in a connection automatically established by the administering system between the personal electronic devices of the traveler and each of the companions assists in determining the distance between them. In particular, the traveler specific parameters requesting a certain maximum/minimum distance between companions is monitored throughout the accompanied transportation in this manner.

During the train trip, each of the companions are provided periodic requests for maintained verification (not shown). In the case of C1, this involves pressing his thumb against a fingerprint sensor on his mobile phone; and in the case of C2, maintained verification is provided by the user inserting a passcode into his mobile telephone.

Accompanied Ambulatory Transportation

Once the train arrives at the train stop closest to the traveler's apartment, the parties commence accompanied ambulatory transportation, and the administering system monitors the location of the parties relative to the accepted transportation path as well as the minimum/maximum distances between the parties—see FIG. 6J. This monitoring is done in this example exclusively by GPS 280 and A-GPS signals 281 that are used to locate the personal electronic device of the companion and traveler, and the relative distance between them. Since the recommended (and selected) parameter for the distance between the companion and the traveler is set at 20 meters (plus or minus 10 meters), short-range communication wireless technology is not utilised in this case. However, a lapel-based (or otherwise wearable, to improve directionality) laser and/or IR wireless technology may be used to measure the distance between the parties in other scenarios.

In this scenario, some time during the accompanied ambulatory transportation, C2 drops away from C1 unannounced (e.g. they have a personal emergency to attend to). Due to the increase in relative distance between C1 and C2 (and C2 and the traveler), as well as C2 diverting off the transportation path, the system recognizes that C2 is no longer participating in the accompanied transportation and send an alert 290 to C1 and the traveler—see FIG. 6H.

During the ambulatory part of the accompanied transportation, after C2 has left (C2 confirms this shortly after the alert in 6H is sent), C1 remains subject to periodic requests for maintained verification.

Close to the traveler's destination, the traveler makes a separation request 291, as depicted in FIG. 6I. In response to this request, C1 is notified by receiving on the interface of his personal electronic device a notification 291 which substantially matches the screen of traveler when making the request. C1 then stops, turns around, and walks for a short distance in a direction away from the traveler. During this time, the relative distance between C1 and traveler is monitored. The separation parameters, in this case a distance of 100 meters within 2 minutes, are satisfied, and the traveler is alerted to this fact (not shown). By this time, the traveler has arrived at her apartment.

End of Accompanied Transportation

Ratings (not shown) are then provided by each of the parties, including a positive rating for C1 and a negative rating for C2 due to that companion's unexplained (until later) departure.

General/Interpretation

The term 'ambulatory' is to be understood as having a wide scope, and include jogging or running or other modes of bipedal transportation. 'Ambulatory' also includes transportation in a wheelchair, other wheeled devices such as a mobility scooter, or other transportation devices used to assist hose that have difficulty walking.

It will be appreciated by those skilled in the art that many modifications and variations may be made to the embodiments described herein without departing from the spirit or scope of the invention. More particularly, the implementations described above with reference to the process flow diagrams in FIGS. 3A and 3B include operations and/or process flows which may be removed, modified and/or added to yet still fall within the scope of the invention.

Furthermore, functionality may be added or deleted from the process flow diagrams and operations may be interchanged among functional blocks. Steps may be added or deleted to methods described within the scope of the present invention.

The word 'connect', 'couple' and similar terms do not necessarily denote direct and immediate connections, but also include connections through intermediate elements or devices.

An algorithm or computer implementable method is here, and generally, considered to be a self-consistent sequence of acts or operations leading to a desired result and examples may be provided in flow charts with steps noted therein. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as, values, elements, terms, numbers or the like.

Unless specifically stated otherwise, use of terms throughout the specification such as "computing", "calculating", "determining", "resolving" or the like, refer to the action and/or processes of a computer or computing system, or similar numerical calculating apparatus, that manipulate and/or transform data represented as physical, such as electronic, quantities within the computing system's registers and/or memories into other data similarly represented as physical quantities within the computing system's memories, registers or other such data storage, transmission or display devices. It should be understood, however, that all of these and similar terms are to be associated with the appropriate physical quantities and are merely convenient labels applied to these quantities.

Various operations may be described as multiple discrete operations in turn, in a manner that may be helpful in understanding embodiments of the present invention; however, the order of description should not be construed to imply that these operations are order dependent.

As used herein, a "computer", "computer system" or "computer-based system" comprises an input device for receiving data, an output device for outputting data in tangible form (e.g. printing or displaying on a computer screen), a permanent memory for storing data as well as computer code, and a processor (e.g. microprocessor) for executing computer code wherein said computer code resident in said permanent memory will physically cause said processor to read-in data via said input device, process said data within said processor and output said processed data via said output device.

Those of skill would further appreciate that the various illustrative logical blocks, modules, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains start-up and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, an external bus may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a web site. The website can be operated on a server computer, or operated locally, e.g., by being downloaded to the client computer, or operated via a server farm. The website can be accessed over a mobile phone or a tablet, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Python or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Although only a few embodiments have been disclosed in detail above, other embodiments are possible and the inventor intends these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose.

The terms in the claims have the broadest scope of meaning they would have been given by a person of ordinary skill in the art as of the relevant date.

The terms "a" and "an" mean "one or more", unless expressly specified otherwise

Neither the title nor any abstract of the present application should be taken as limiting in any way the scope of the claimed invention.

Where the preamble of a claim recites a purpose, benefit or possible use of the claimed invention, it does not limit the claimed invention to having only that purpose, benefit or possible use.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

In the present specification, terms such as "component", "item", "element", "means", "device" and "member" may refer to singular or plural items and are terms intended to refer to a set of properties, functions or characteristics performed by one or more items having one or more parts. It is envisaged that where a "component", "item", "element", "means", "device" or "member" or similar term is described as being a unitary object, then a functionally equivalent object having multiple components is considered to fall within the scope of the term, and similarly, where a "component", "item", "element", "means", "device" or "member" is described as having multiple items, a functionally equivalent but unitary object is also considered to fall within the scope of the term, unless the contrary is expressly stated or the context requires otherwise.

The term "connected" or a similar term, should not be interpreted as being limitative to direct connections only. Thus, the scope of the expression an item A connected to an item B should not be limited to items or systems wherein an output of item A is directly connected to an input of item B. It means that there exists a path between an output of A and an input of B which may be a path including other items or means. "Connected", or a similar term, may mean that two or more elements are either in direct physical or electrical contact, or that two or more elements are not in direct contact with each other yet still co-operate or interact with each other.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A computer implemented method for connecting pre-authorised and verified individuals for accompanied transportation, the method comprising:
   receiving input from a pre-authorised traveller from a personal electronic device of the traveller, including traveller specific transportation parameters including a meeting time, a meeting place, and a meeting destination;
   receiving input from one or more pre-authorised companion from a respective personal electronic device of the companion, including companion specific transportation parameters including an acceptable meeting time, an acceptable meeting place, and an acceptable meeting destination;
   executing a transportation optimisation step including comparing and matching the transportation parameters of the pre-authorised traveller with the transportation parameters of the one or more of the pre-authorised companion to select the pre-authorised companions the transportation parameters of which most closely match the transportation parameters of the pre-authorised traveller, wherein the optimisation step includes an assessment of one or more safety related parameters;
   presenting on the personal electronic device of the pre-authorised traveller one or more optimised transportation proposal for acceptance by the pre-authorised traveller, each optimised transportation proposal being related to one or more optimised companion, wherein the presenting of the one or more optimised transportation proposal includes presenting one or more matched parameters for selection, wherein the matched parameters include the one or more safety related parameters;
   upon registering a traveller selections and acceptance of one of the one or more optimised transportation proposal, notifying the traveller and the optimised companion related to the accepted transportation proposal that the transportation proposal has been accepted;
   providing to the traveller or companion computer implemented verification prior to or at an accepted meeting time to enable verification of identities of the traveller or the one or more optimised companion when the pre-authorised traveller and the companion meet at an accepted meeting place;
   after the pre-authorized traveller and the companion meet at the accepted meeting place,
      automatically establishing a wireless connection between the personal electronic device of the pre-authorised traveller and the personal electronic device of the companion via a positioning system during the accompanied transportation;
      enabling the personal electronic device of the pre-authorized traveller and the personal electronic device of the companion to monitor a wireless signal in the wireless connection between the personal electronic device of the pre-authorised traveller and the personal electronic device of the companion to determine: a real-time location of the pre-authorised traveller or companion relative to an accepted transportation path during the accompanied transportation, or a real-time relative location of the traveller and companion with respect to a minimum distance between the companion and the pre-authorised traveller during the accompanied transportation;
      sending an alert to the personal electronic device of the traveller if the real-time location or the real-time relative location is not in a minimum/maximum distance range;
   and wherein the computer implemented verification comprises:
      audio/visual data matching based on comparison of a real-time voice or image recording of the traveller or companion taken by the personal device, with a previously supplied voice or image recording of the traveller or companion; or
      confirmation of the relative real-time location of the other traveller or companion;
      such that the transportation paths, the real-time locations, relative location, and audio/visual data matching of the traveller or companion are provided by input received from the personal electronic device of the traveller or companion.

2. The computer implemented method of claim 1, wherein the method includes means to recognise, in real-time, that the traveller or companion is travelling on or using a particular mode of transportation, the particular mode of transportation being recognisable by a location, direction or speed of movement of the traveller or companion or vehicle providing the particular mode of transportation.

3. The computer implemented method of claim 2, wherein the particular mode of transportation comprises a particular mode of communal vehicular transportation including one or more, or any combination of the following:
   train
   tram
   bus, or other mass-transit road vehicle
   ferry, or other mass-transit water craft
accessible to members of the public.

4. The computer implemented method of claim 3, wherein recognising that a traveller or companion is travelling on or using a particular mode of communal vehicular transportation includes assessing one or more of, or any combination of the following characteristics of a communal vehicle, including:
   a scheduled location of a vehicle comprising the particular mode of communal vehicular transportation;
   an actual location of a vehicle comprising the particular mode of communal vehicular transportation;
   collective movement of a plurality of companions or travellers;
   the relative location of two or more travellers or companions;
   communication from a companion or traveller contemporaneously on the particular mode of communal vehicular transportation.

5. The computer implemented method of claim 3, wherein the method includes means to recognise that a traveller or companion is travelling on or using a particular communal vehicle, wherein recognising that a traveller or companion is travelling on or using the particular communal vehicle includes assessing one or more of, or any combination of the following characteristics of the particular communal vehicle, including:
   a scheduled location of the particular vehicle;
   an actual location of the particular vehicle;
   a collective movement of a plurality of companions or travellers;
   the relative location of two or more travellers or companions;
   the personal electronic device of the traveller or companion communicating with an electronic device on the particular communal vehicle in which the traveller or companion is located; or
   communication from a companion or traveller contemporaneously on the particular vehicle.

6. The computer implemented method of claim 2, wherein real-time monitoring of safety related parameters or recognition of the mode of transportation is enabled by application of one or more of, or any combination of, the following features on a personal electronic device used by the relevant party to the accompanied transportation:
   GPS
   A-GPS
   LTE or other Beacon
   Other short-range or medium-range wireless communication technology.

7. The computer implemented method of claim 1, wherein the assessment of one or more safety related parameters during the optimisation step includes an assessment of the one or more safety related parameters input by the traveller or companion, and adding one or more safety related parameters for comparison and matching in the optimisation step.

8. The computer implemented method of claim 7, wherein during the presentation of proposals for acceptance step, the traveller or companion is able to select one or more safety related parameters received as input by the traveller or companion or one or more safety related parameters generated as a result of the assessment of safety related parameters during the optimisation step.

9. The computer implemented method of claim 1, further comprising monitoring the one or more of the safety related parameters in real-time to determine whether those parameters are satisfied; effecting real-time communication with the traveller or companion in response to the monitored one or more safety related parameters; and updating, by the companion or traveller in real-time, the one or more safety related parameter.

10. The computer implemented method of claim 1, wherein the one or more safety related parameters include one or more parameters relating to a security rating of a transportation path, a meeting place and/or mode of transportation.

11. The computer implemented method of claim 10, wherein the security rating of any of the transportation parameters regarding the meeting place or potential transportation path includes any one or more, or any combination of the following:
   a lighting rating;
   criminal activity (both current and historical) rating in an area;
   an amount of traffic;
   a number of open commercial establishments;
   a number or relative location of user identified secure spots; and
   traveller or companion feedback in relation to the above.

12. The computer implemented method of claim 1, wherein the one or more safety related parameters include one or more, or any combination of the following:
   a location of the party relative to a meeting place;
   a number of parties in an accompanied transportation;
   a rating or other characteristics of the party;
   an expected waiting time until the accompanied transportation begins;
   a duration of the accompanied transportation;
   the location of the party relative to an accepted transportation path during the accompanied transportation.

13. The computer implemented method of claim 1, wherein the one or more safety related parameter includes a traveller request that the companion separate from the traveller.

14. The computer implemented method of claim 13, wherein the separation request includes separation request parameters such as a predetermined distance between the traveller and the companion or that separation occur within a predetermined time after the request has been made.

15. The computer implemented method of claim 14, wherein the method includes the step of checking that, in response to a separation request, the separation request parameters are satisfied by location determination via the personal electronic device of the traveller or companion.

16. The computer implemented method of claim 1, wherein the method includes, in relation to a proposed accompanied transportation, making optimised transportation suggestions to the traveller or companion regarding the safety related parameters or mode of transportation, based on the assessment of the safety related parameters, prior to acceptance of the proposal.

17. The computer implemented method of claim 16, wherein the optimised transportation suggestion is made at the stage of the companion or traveller selecting or inputting traveller or companion specific transportation parameters, respectively.

18. The computer implemented method of claim 1, wherein the optimisation step comprises comparing and matching a proposed transportation path of the traveller and one or more pre-existing transportation path of the one or more companion.

19. The computer implemented method of claim 18, wherein the pre-existing transportation path of the companion is sourced from a third party map or travel planning resource.

20. The computer implemented method of claim 1, wherein the method includes registering the personal devices used by each traveller and companion, and monitoring whether the registered personal device are kept on the person of the traveller or companion during any agreed transportation by requesting that the traveller or companion regularly respond to requests for maintained verification.

21. The computer implemented method of claim 20, wherein requests for maintained verification include requiring the traveller or companion providing identification confirmation information, including one or more of the identification confirmation information selected from the list below:
   entering an ID number or code words assigned to the party;
   audio/visual data matching based on comparison of a real-time voice or image recording of the party taken by the personal device, with a previously supplied voice or image recording of the traveller or companion;
   digital fingerprint matching based on comparison of a real-time digital fingerprint reading of a party;
   confirmation of the relative location of the other traveller or companion; or
   an identification process provided by a third party application.

22. The computer implemented method of claim 1, wherein a traveller destination is not precisely communicated to the one or more companion.

23. The computer implemented method of claim 1, wherein in relation to any completed accompanied transportation, a system administering the accompanied transportation is able to provide a rating of the traveller or companion, and the rating of the traveller or companion is decreased if one or more of the one or more safety related parameters of an accompanied transportation is breached.

24. The computer implemented method of claim 23, wherein the companion rating is decreased if a companion has breached the safety related parameters comprising one or more of the minimum distance between companion and traveller, or adherence of the companion to the accepted transportation path, or a satisfaction of a separation request, during completed accompanied transportations.

25. The computer implemented method of claim 1, wherein accompanied transportation includes the companion accompanying an ambulatory traveller for at least a part of the accompanied transportation.

26. The computer implemented method of claim 1, wherein the accompanied transportation includes one or more travellers being accompanied by a plurality of companions.

27. The computer implemented method of claim 26, wherein the plurality of companions includes a least one principal companion that selects or inputs transportation parameters indicating they will accompany a traveller for a complete duration of the accompanied transportation.

28. The computer implemented method of claim 27, wherein the principal companion has public security experience or public safety related qualifications verified by a system administering the accompanied transportation.

29. A computer system for connecting pre-authorised and verified individuals for accompanied transportation, the computer system including:
   a program memory storing program code;
   a processor for implementing the program code stored in the program memory;
   wherein the program code comprises instructions for the processor to:
      receive input from a pre-authorised traveller, including traveller specific transportation parameters including a meeting time, a meeting place, and a meeting destination;
      receive input from one or more pre-authorised companions, including companion specific transportation parameters including an acceptable meeting time, an acceptable meeting place, and an acceptable meeting destination;
      execute a transportation optimisation step including comparing and matching the transportation parameters of the pre-authorised traveller with the transportation parameters of the one or more of the pre-authorised companion to select the pre-authorised companions the transportation parameters of which most closely match the transportation parameters of the pre-authorised traveller, wherein the optimisation step includes an assessment of one or more safety related parameters;
      present on the personal electronic device of the pre-authorised traveller one or more optimised transportation proposal for acceptance by the traveller, each optimised transportation proposal being related to one or more optimised companion, wherein the presenting of the transportation proposal includes presenting matched parameters for selection;
      register traveller selections and acceptance of the transportation proposal, and to upon registration, notify the traveller and the optimised companion related to the accepted transportation proposal that the transportation proposal has been accepted;
      provide to the traveller or companion computer implemented verification prior to or at an accepted meeting time to enable verification of identities of the traveller or the one or more optimised companion when the pre-authorised traveller and the companion meet at an accepted meeting place;
      after the pre-authorized traveller and the companion meet at the accepted meeting place,
         automatically establish a wireless connection between the personal electronic device of the pre-authorised traveller and the personal electronic device of the companion via a positioning system during the accompanied transportation;
         enable the personal electronic device of the pre-authorized traveller and the personal electronic device of the companion to monitor a wireless signal in the wireless connection between the personal electronic device of the pre-authorized traveller and the personal electronic device of the companion to determine: a real-time location of the pre-authorised traveller or companion relative to an accepted transportation path during the accompanied transportation, or a real-time relative location of the pre-authorised traveller and companion with respect to a minimum distance between the companion and the pre-authorised traveller during the accompanied transportation; and send an alert to the personal electronic device of the traveller if the real-time location or the real-time relative location is not in a minimum/maximum distance range.

30. A non-transitory computer-readable storage medium comprising instructions that, responsive to execution by a computer, cause the computer to implement a method for connecting pre-authorised and verified individuals for accompanied transportation, the method comprising:

receiving input from a pre-authorised traveller from a personal electronic device of the traveller, including traveller specific transportation parameters including a meeting time, a meeting place, and a meeting destination;

receiving input from one or more pre-authorised companion from a respective personal electronic device of the companion, including companion specific transportation parameters including an acceptable meeting time, an acceptable meeting place, and an acceptable meeting destination;

executing a transportation optimisation step including comparing and matching the transportation parameters of the pre-authorised traveller with the transportation parameters of the one or more of the pre-authorised companion to select the pre-authorised companions the transportation parameters of which most closely match the transportation parameters of the pre-authorised traveller, wherein the optimisation step includes an assessment of one or more safety related parameters;

presenting on the personal electronic device of the pre-authorised traveller one or more optimised transportation proposal for acceptance by the pre-authorised traveller, each optimised transportation proposal being related to one or more optimised companion, wherein the presenting of the one or more optimised transportation proposal includes presenting one or more matched parameters for selection, wherein the matched parameters include the one or more safety related parameters;

upon registering a traveller selections and acceptance of one of the one or more optimised transportation proposal, notifying the traveller and the optimised companion related to the accepted transportation proposal that the transportation proposal has been accepted;

providing to the traveller or companion computer implemented verification prior to or at an accepted meeting time to enable verification of identities of the traveller or the one or more optimised companion when the pre-authorised traveller and the companion meet at an accepted meeting place;

after the pre-authorized traveller and the companion meet at the accepted meeting place,
automatically establishing a wireless connection between the personal electronic device of the pre-authorised traveller and the personal electronic device of the companion via a positioning system during the accompanied transportation;

enabling the personal electronic device of the pre-authorized traveller and the personal electronic device of the companion to monitor a wireless signal in the wireless connection between the personal electronic device of the pre-authorised traveller and the personal electronic device of the companion to determine: a real-time location of the pre-authorised traveller or companion relative to an accepted transportation path during the accompanied transportation, or a real-time relative location of the traveller and companion with respect to a minimum distance between the companion and the pre-authorised traveller during the accompanied transportation;

sending an alert to the personal electronic device of the traveller if the real-time location or the real-time relative location is not in a minimum/maximum distance range;

and wherein the computer implemented verification comprises:
audio/visual data matching based on comparison of a real-time voice or image recording of the traveller or companion taken by the personal device, with a previously supplied voice or image recording of the traveller or companion; or confirmation of the relative real-time location of the other traveller or companion;

such that the transportation paths, the real-time locations, relative location, and audio/visual data matching of the traveller or companion are provided by input received from the personal electronic device of the traveller or companion, including the step of receiving input from, presenting at least one transportation proposal to, providing computer implemented verification to, monitoring, and communicating with the traveller or companion via at least one traveller or companion interface, respectively.

* * * * *